(12) United States Patent
Aoki

(10) Patent No.: US 8,718,214 B2
(45) Date of Patent: May 6, 2014

(54) SIGNAL WIRING SYSTEM AND JITTER SUPPRESSION CIRCUIT

(75) Inventor: Yasushi Aoki, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 83 days.

(21) Appl. No.: 13/403,124

(22) Filed: Feb. 23, 2012

(65) Prior Publication Data

US 2012/0224656 A1  Sep. 6, 2012

(30) Foreign Application Priority Data

Mar. 2, 2011  (JP) .................................. 2011-044895

(51) Int. Cl.
*H04L 25/00* (2006.01)

(52) U.S. Cl.
USPC ........................................................ 375/357

(58) Field of Classification Search
USPC ........... 375/257, 224, 226; 327/217; 330/100, 330/260; 341/144, 145, 154
See application file for complete search history.

(56) References Cited

U.S. PATENT DOCUMENTS

| 2004/0046484 | A1* | 3/2004 | Schiller | 310/317 |
| 2010/0117736 | A1* | 5/2010 | Liao | 330/260 |
| 2011/0018627 | A1 | 1/2011 | Sutardja | |

FOREIGN PATENT DOCUMENTS

| JP | 6-53947 A | 2/1994 |
| JP | 2001-344040 A | 12/2001 |
| JP | 2007-202147 A | 6/2007 |

* cited by examiner

*Primary Examiner* — Khai Tran
(74) *Attorney, Agent, or Firm* — Sughrue Mion, PLLC

(57) ABSTRACT

Reducing jitter in signal wiring without requiring a larger circuit scale is difficult in the technology of the related art. A signal wiring system to resolve the above problem therefore includes an output unit to output a differential signal, a receiver unit to receive differential signals from the output unit, a jitter suppression circuit to suppress the amount of the jitter in the differential signal received by the receiver unit according to a suppression coefficient, and a signal wiring unit for conveying a differential signal from the output unit and including a wiring length set according to a suppression coefficient in the jitter suppression circuit.

18 Claims, 25 Drawing Sheets

SIGNAL WIRING SYSTEM AND JITTER SUPPRESSION CIRCUIT

CROSS-REFERENCE TO RELATED APPLICATIONS

The disclosure of Japanese Patent Application No. 2011-44895 filed on Mar. 2, 2011 including the specification, drawings and abstract is incorporated herein by reference in its entirety.

BACKGROUND

The present invention relates to a signal wiring system and a jitter suppression circuit.

A jitter suppression circuit of the related art is disclosed for example in Japanese Unexamined Patent Application Publication No. 2001-344040 and Japanese Unexamined Patent Application Publication No. Hei6(1994)-53947.

The technology described in Japanese Unexamined Patent Application Publication No. 2001-344040 discloses a jitter eliminator shaping circuit 10 comprised of a band-pass filter 12 and a shaping circuit 13. The band-pass filter 12 passes only fundamental clock frequency components from the fundamental clock signal including jitter input from the input terminal 11. The shaping circuit 13 makes a voltage comparison of the output signal from a band-pass filter 12 in a comparator, and reproduces and outputs the fundamental clock (pulse).

The technology described in Japanese Unexamined Patent Application Publication No. Hei6(1994)-53947 discloses a jitter suppression circuit 20 comprised of a jitter component detector circuit 22, a variable amplifier 23, a differential amplifier 24, and a clock recovery circuit 25. The jitter component detector circuit 22 extracts just the jitter component from the clock signal containing the jitter component from the input terminal 21. The variable amplifier 23 sets an extracted jitter component amplitude that is smaller than the clock signal amplitude. The differential amplifier 24 generates a differential signal whose phase is corrected (offset) versus the jitter phase by utilizing the difference between the clock signal and the variable amplifier output, and outputs that differential signal. The clock recovery circuit 25 outputs the recovered clock signal to the output terminal based on a zero cross-point of the differential signal as a time reference.

SUMMARY

The technology in Japanese Unexamined Patent Application Publication No. 2001-344040 requires analog circuit components to configure a band-pass filter 12. The components that configure the band-pass filter are capacitors and resistors, however when forming capacitors over a semiconductor chip maintaining a small component surface area is difficult so that a larger chip size is required. Making the components such as capacitors smaller on the other hand, narrows the frequency band of the band-pass filter and also narrows the frequency range where jitter can be removed. Another problem is that there is little effect in the low frequency range from eliminating jitter.

In the technology disclosed in Japanese Unexamined Patent Application Publication No. Hei6(1994)-53947, the jitter component detector circuit 22 extracts just the jitter component from the clock signal containing the jitter component, however this technology also requires an analog circuit such as a filter. This technology has the same problem as Japanese Unexamined Patent Application Publication No. 2001-344040 in that maintaining a small component surface area is difficult so that a larger chip size is required. The variable amplifier 23 also causes an increased circuit scale size.

According to one aspect of the present invention, a signal wiring system includes an output unit to output a differential signal, a receiver unit to receive the differential signal from the output unit, a jitter suppression circuit to suppress the amount of the jitter in the differential signal received by the receiver unit according to a suppression coefficient, and a signal wiring unit for conveying a differential signal from the output unit to the receiver unit and including a wiring length set according to a suppression coefficient in the jitter suppression circuit.

According to another aspect of the present invention, a signal wiring system includes an output unit to output a differential signal, a receiver unit to receive the differential signal from the output unit, and a jitter suppression circuit to suppress the amount of the jitter in the differential signal received by the receiver unit according to a suppression coefficient, and in which the output unit outputs a differential signal at a drivability matching the suppression coefficient of the jitter suppression circuit.

According to still another aspect of the present invention, a jitter suppression circuit includes a differential amplifier circuit to input a differential input signal to an inverting input terminal and a non-inverting input terminal, and to output an output signal according to the differential input signal to an inverting output terminal and a non-inverting output terminal; and a first feedback resistor unit coupled between the inverting input terminal, and a non-inverting output terminal of the differential amplifier circuit; and a second feedback resistor unit coupled between the non-inverting input terminal and the inverting output terminal of the differential amplifier circuit; and in which the first and the second feedback resistor units possess resistance values so that the DC gain of the output signal is 5 to 15 decibels or less than the differential input signal of the differential amplifier circuit.

According to the aspects of the present invention, the amount of jitter in the differential signal received by the receiver can be reduced without requiring a filter of analog circuit components.

The present invention is capable of suppressing the increase of the circuit scale while reducing the amount of jitter in the signal wiring.

DETAILED DESCRIPTION OF THE PREFERRED EMBODIMENTS

First Embodiment

Figure 1:
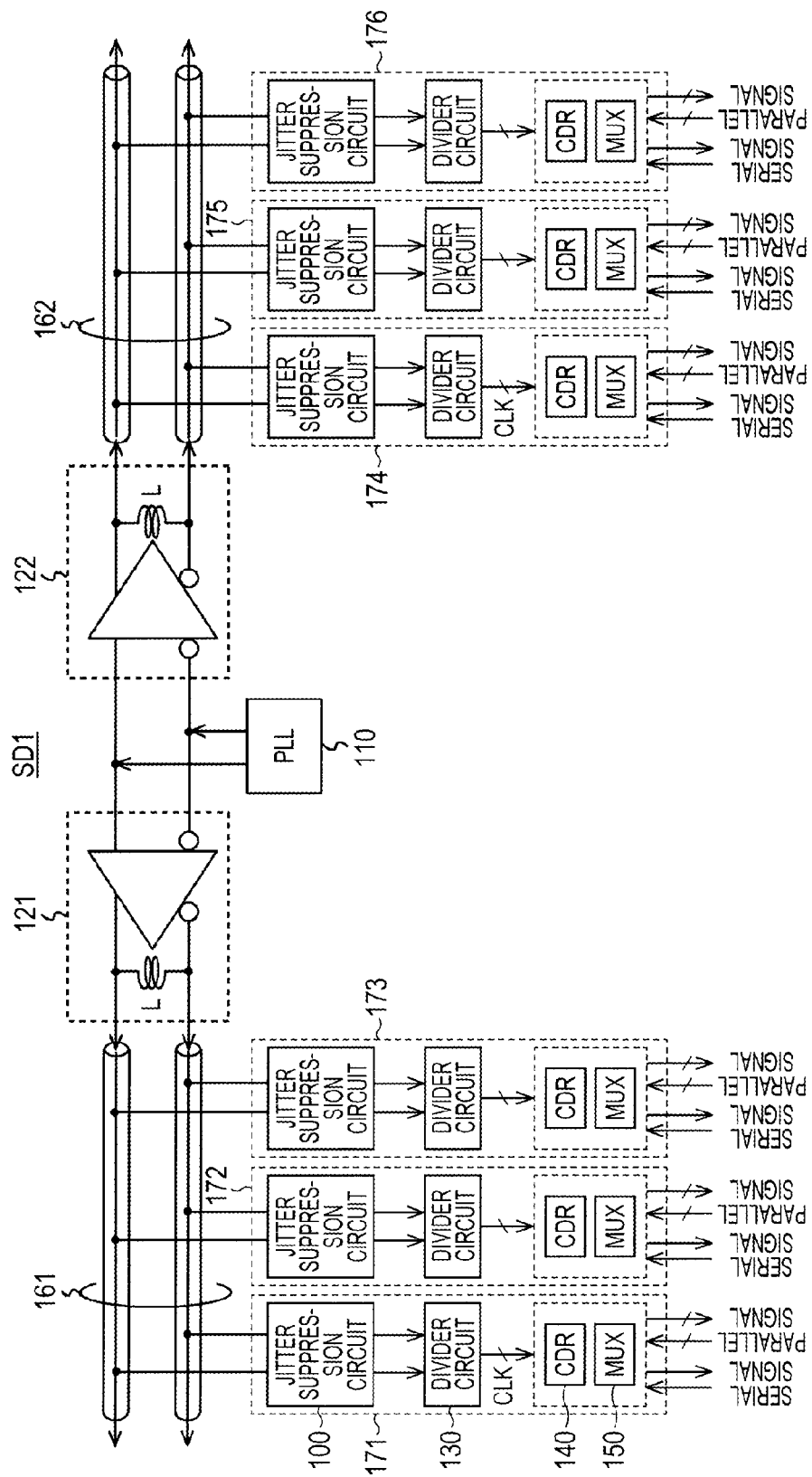
FIG. 1 is a diagram showing the structure of the SerDes circuit of the first embodiment.

The first embodiment of the present invention is described in detail next while referring to the drawings. In the first embodiment the present invention is applied to the case where the jitter suppression circuit is contained within the SerDes circuit. The SerDes (Serializer/Deserializer) circuit SD1 of the first embodiment is first of all described while referring to FIG. 1

The SerDes circuit SD1 as shown in FIG. 1 contains a PLL circuit 110, the clock drivers 121, 122, the transmit-receive circuits 171 through 176, and the signal distribution lines 161, 162.

The SerDes circuit SD1 sends and receives a plurality of high-speed data signals. The SerDes circuit SD1 converts parallel signals to serial signals, and converts serial signals to parallel signals. The SerDes circuit SD1 for example sends and receives high-speed data signals at 5 Gbps such as via USB3.0, etc. The SerDes circuit SD1 also requires high-speed components such as the operation clocks in the send-receive circuit 171 through 176 that perform parallel-to-serial conversion, and serial-to-parallel conversion when sending and receiving high-speed data signals such as in this type of SerDes circuit SD1.

The PLL circuit 110 generates the clock signals utilized within the SerDes circuit SD1. The clock frequency of these generated clock signals are for example 5 GHz and are high-speed signals. The clock signal generated by the PLL circuit 110 in this example is a differential signal and is hereafter referred to as a differential clock signal.

Figure 2:
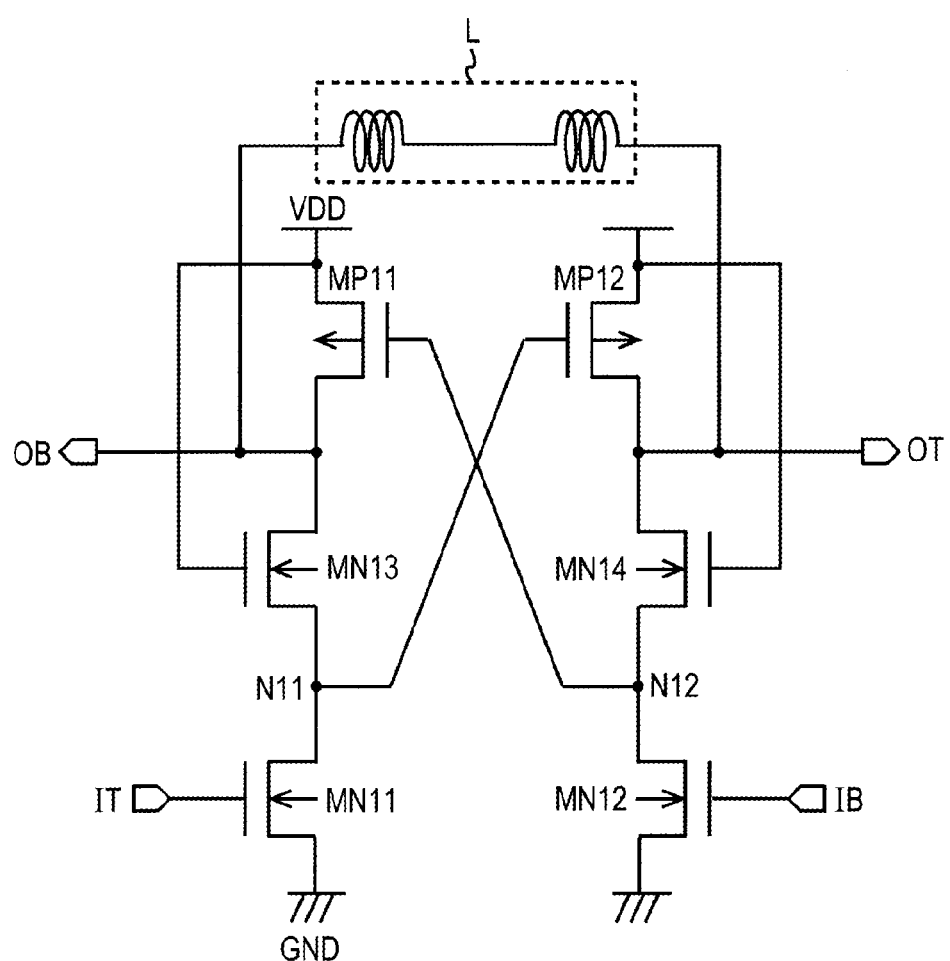
FIG. 2 is a diagram showing the structure of the clock driver of the first embodiment.

The clock drivers 121, 122 buffer the respective differential clock signals generated by the PLL circuit 110, and output them to the signal distributor lines 161, 162. FIG. 2 shows the circuit configuration of the clock driver 121. The clock driver 122 has an identical circuit configuration. The clock driver 121 as shown in FIG. 2 is comprised of the PMOS transistors MP11, MP12, and the NMOS transistors MN11 through MN14, and the inductor L.

The source of the PMOS transistor MP11 is coupled to the supply terminal VDD, the drain is coupled to the inverting output terminal OB, and the gate is coupled to the node N2. The source of the PMOS transistor MP12 is coupled to the supply terminal VDD, the drain is coupled to the non-inverting output terminal OT, and the gate is coupled to the node N11.

The drain of the NMOS transistor MN13 is coupled to the inverting output terminal OB, the source is coupled to the node N11, and the gate is coupled to the supply terminal VDD. The drain of the NMOS transistor MN14 is coupled to the non-inverting output terminal OT, the source is coupled to the node N12, and the gate is coupled to the supply terminal VDD.

The drain of the NMOS transistor MN11 is coupled to the node N11, the source is coupled to the ground terminal GND, and the gate is coupled to the non-inverting input terminal IT. The drain of the NMOS transistor MN12 is coupled to the node N12, the source is coupled to the ground terminal GND, and the gate is coupled to the inverting input terminal IB.

The inductor L is coupled between the non-inverting output terminal OT and the inverting output terminal OB.

The differential clock signals generated by the PLL circuit 110 are input to the inverting input terminal and the non-inverting input terminal and are output from the inverting input terminal and the non-inverting input terminal.

When noise is here superimposed on the voltage (hereon, called supply voltage VDD as needed) supplied to the terminal (supply terminal VDD) that supplies the clock drivers 121, 122 power, that same supply noise is superimposed on the differential clock signals from the non-inverting output terminal OT and the inverting output terminal OB in the same way (See FIG. 13, FIG. 14 described later on). Those differential clock signals on which the noise is superimposed, are then output to the signal distribution wires 161, 162.

The differential clock signals output from the clock driver 121 are distributed to the send-receive circuits 171-173 by way of the signal distribution line 161. The differential clock signal output from the clock driver 122 is distributed by way of the signal distribution line 162 to the send-receive clocks 174-176.

The signal distribution lines 161, 162 for example have a length of approximately three millimeters which imposes a large load capacitance for semiconductor chips that are only a few millimeters wide. Here, when propagating signals through the signal distribution lines 161, 162 such as in this example having a length for example of three millimeters, the differential clock signal at this high frequency attenuates, and the clock amplitude becomes smaller. However, there is no attenuation in the amount of jitter superimposed on the differential clock signal and therefore some mechanism is required to suppress this jitter. The "three millimeters" referred to here is merely an example, and the wire length is not limited to the numbers in this description.

Figure 3:
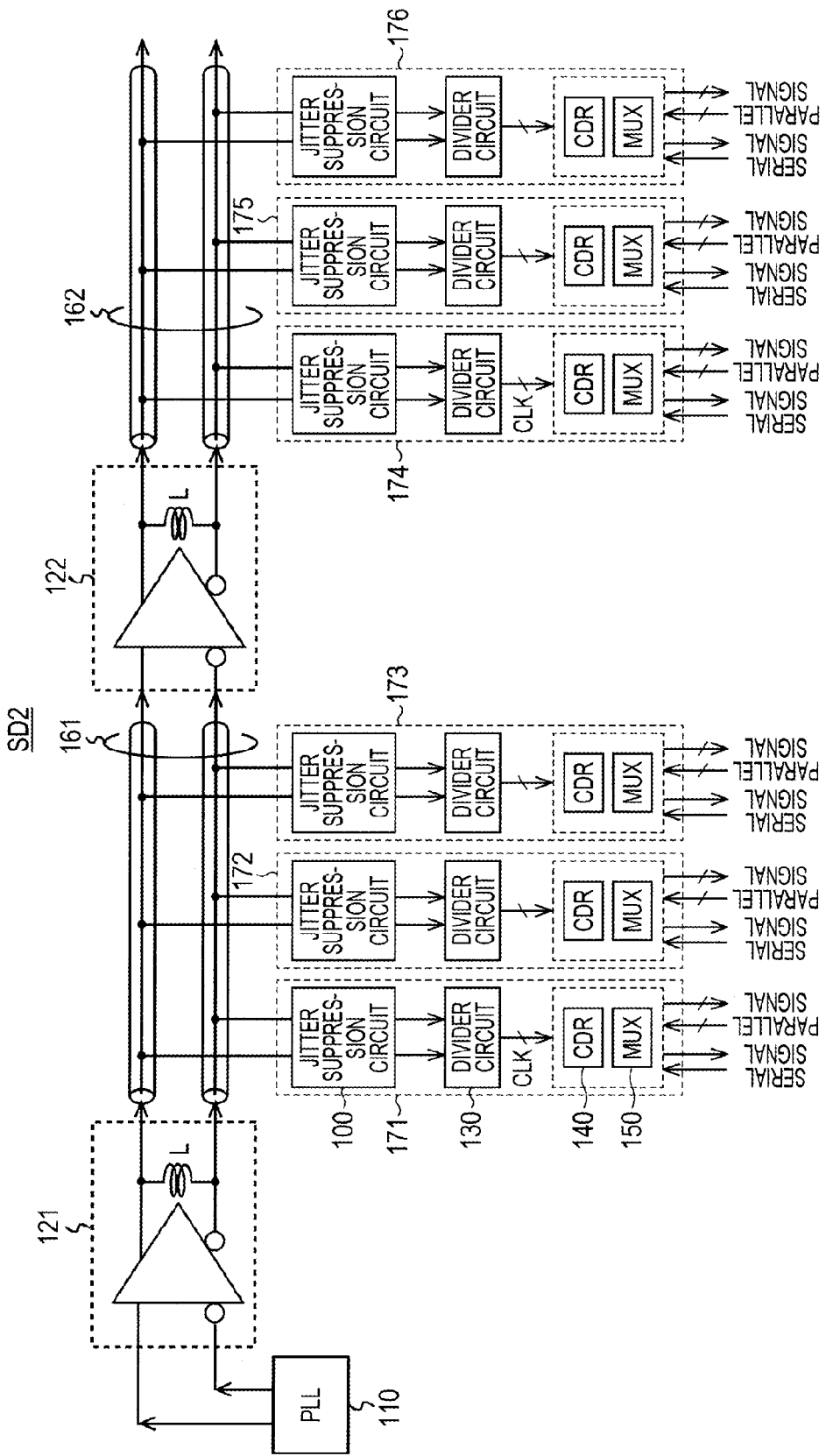
FIG. 3 is a diagram showing the structure of the SerDes circuit of the first embodiment.

In the SerDes circuit SD1 in FIG. 1, the differential clock signals respectively driven by the clock drivers 121, 122 were distributed into three signals, however when there are even more signal distributions then the wiring length of the signal distribution lines 161, 162 becomes long, so that additional send-receive circuits must be coupled. However the amplitude of the differential clock signals attenuates as described above so that the attenuated differential clock signals must be amplified. Therefore, as shown in FIG. 3, a configuration such as the SerDes circuit SD2 can be employed in which the clock drivers distribute the differential clock signals while coupled in plural stages. In the example in FIG. 3, the clock driver 122 is serially coupled to the clock driver 121 and all other parts of the structure are identical to FIG. 1. The clock drivers are serially coupled in plural stages as shown in FIG. 3, however in this case the path is along clock drivers arrayed in a plurality of stages so that the (power) supply noise in the clock drivers 121, 122 causes the problem that jitter is further superimposed on the amplified differential clock signal. The larger the number of coupled clock driver stages, the greater the deterioration in quality due to jitter. Therefore some scheme to reduce jitter is needed even in a structure such as shown in FIG. 3.

The send-receive circuits 171-176 are respectively comprised of a jitter suppression circuit 100, a divider circuit (DIV) 130, a clock data recovery circuit (CDR) 140, and a multiplexer circuit (MUX) 150.

Figure 4:
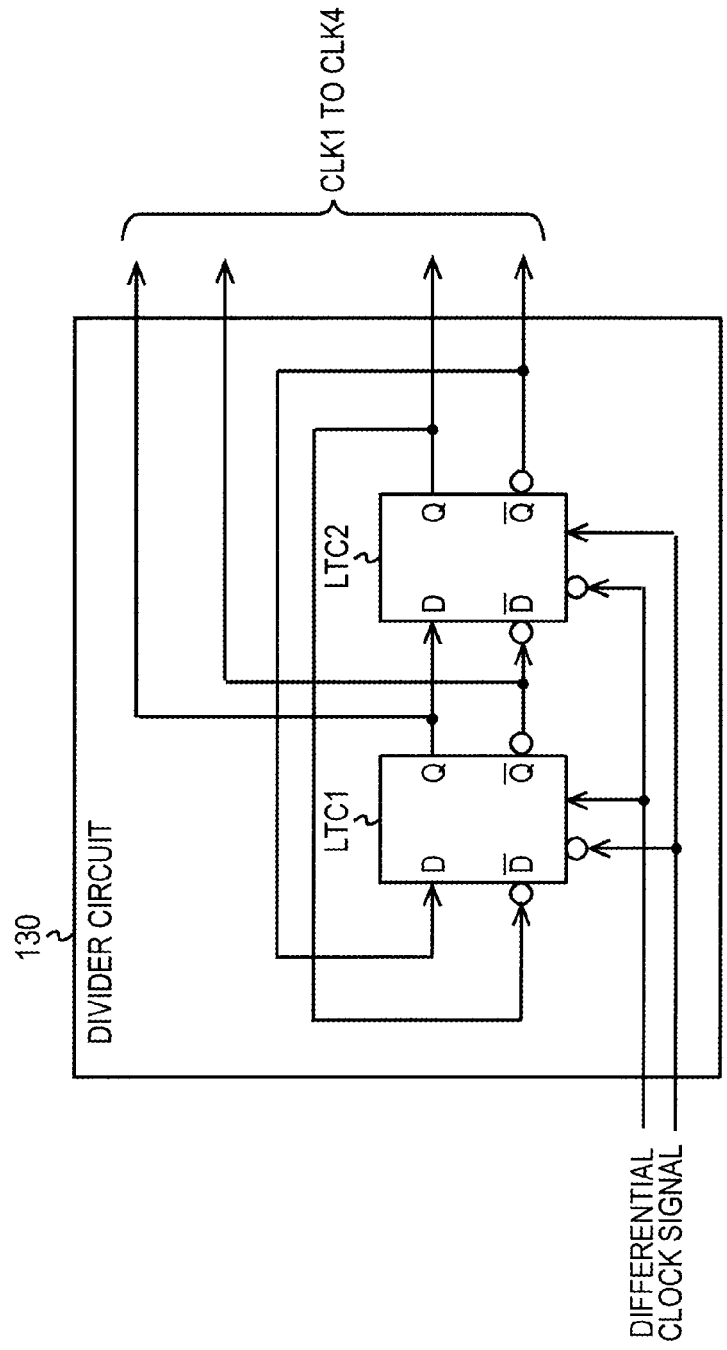
FIG. 4 is a diagram showing the structure of the divider circuit of the first embodiment.
Figure 5:
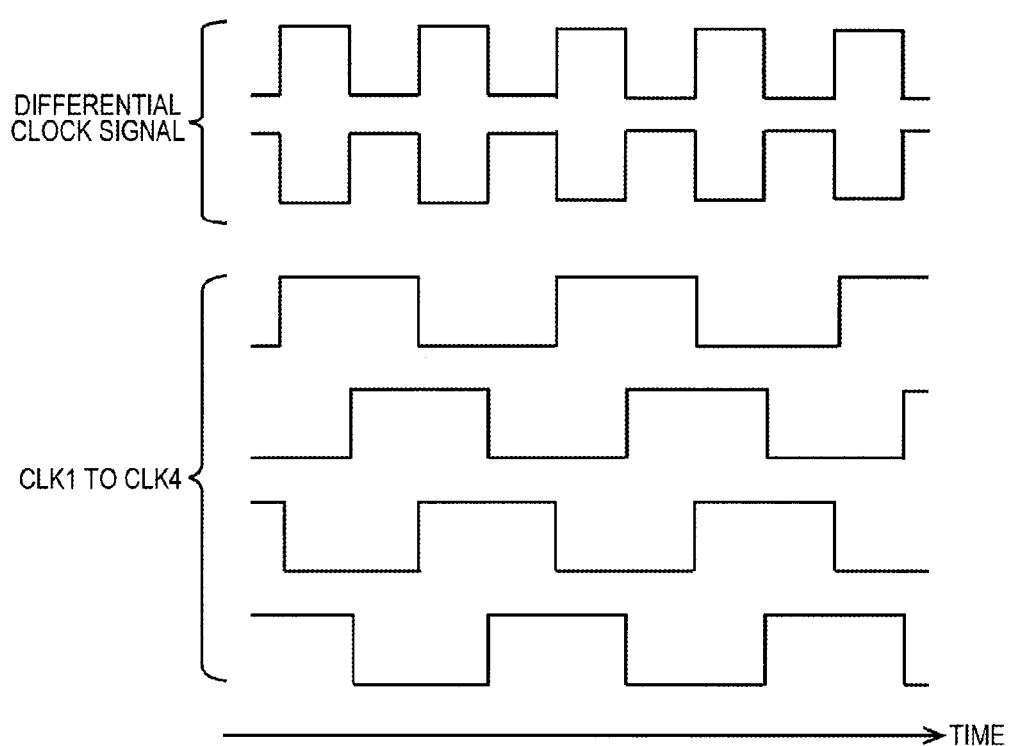
FIG. 5 is a timing chart (ideal operation) of the divider circuit of the first embodiment.

The divider circuit 130 divides the differential clock signals input by way of the jitter suppression circuit 100 into two portions, and generates the four-phase clock signals CLK1-CLK4. FIG. 4 shows one example of the structure of the divider circuit 130. The divider circuit 130 as shown in FIG. 4 contains the latch circuit LTC1, LTC2 to configure a toggle flip-flop. FIG. 5 shows a timing chart of an ideal operating pattern for the divider circuit 130. The signal waveform in this timing chart shows the case for ideal operation where not subjected to effects such as from jitter, etc. The divider circuit utilizing the toggle flip-flop configuration is a typical configuration so a detailed description such as the operation is omitted here. The clock signals CLK1-CLK4 generated by the divider circuit 130 are operating clock pulses for the clock data recovery circuit 140 and the multiplexor circuit 150. Operation is essentially high-frequency operation at for example 5 GHz so if the amount of jitter in the differential clock signal input to the divider circuit 130 is large then the amount of jitter in the clock signal output from the divider circuit 130 will also be larger The clock data recovery circuit 140 utilizes the clock signal generated by the divider circuit 130 as the operation clock. The clock data recovery circuit 140 converts the serial data that was input into parallel data and outputs that parallel data.

The multiplexer circuit 150 operates while using the clock signal generated by the divider circuit 130 as the operation clock. The multiplexer circuit 150 converts the serial data that was input into parallel data and outputs that parallel data.

The clock data recovery circuit 140 and the multiplexer circuit 150 utilize the clock signal generated by the divider circuit 130 as the operation clock so that if the amount of jitter in this clock signal is large then this large amount of jitter will cause degraded high-speed data receive characteristics and transmit characteristics. Some mechanism is therefore required to suppress jitter in the differential clock signals input to the divider circuit 130.

The jitter suppression circuit 100 contains a function to suppress jitter in the differential clock signals respectively input to the send-receive circuits 171-176. Suppressing jitter in the differential clock signals input to the divider circuit 130 also suppresses jitter in the four-phase clock signals CLK1-CLK4 output by the divider circuit 130. Utilizing these jitter-suppressed four-phase clock signals CLK1-CLK4 as operation clocks in the clock data recovery circuit 140 and the multiplexer circuit 150 consequently allows avoiding degradation of their high-speed data receive characteristics and transmit characteristics.

Figure 6:
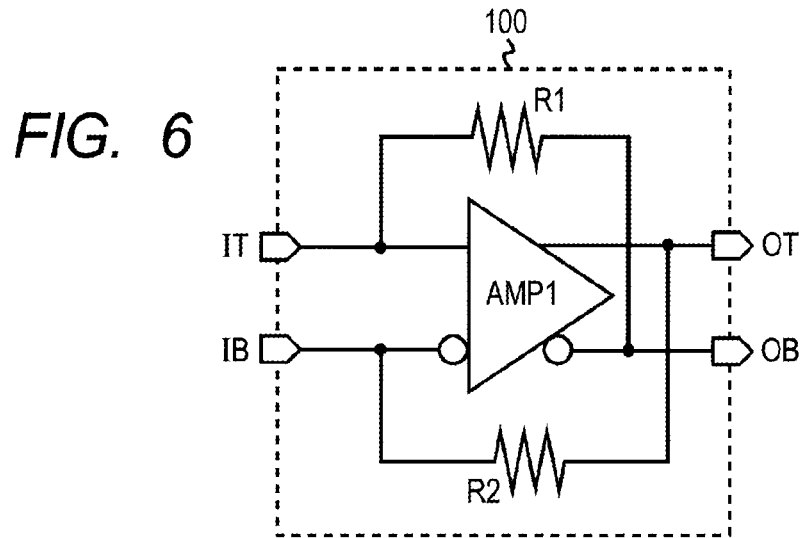
FIG. 6 is concept diagram of the jitter suppression circuit of the first embodiment.

FIG. 6 shows the structure of the jitter suppression circuit 100. This jitter suppression circuit 100 is comprised of a differential amplifier circuit AMP1, and the feedback resistors R1 and R2.

The differential amplifier circuit AMP1, inputs one differential clock signal into the non-inverting input terminal IT, and inputs the other differential clock signal into the inverting input terminal IB. The differential amplifier circuit AMP1 outputs an output differential signal from the non-inverting output terminal OT, and the inverting output terminal OB according to the differential clock signal input to the non-inverting input terminal and the inverting input terminal.

The feedback resistor R1 is coupled between the non-inverting input terminal IT and the inverting output terminal OB of the differential amplifier circuit AMP1. The feedback resistor R2 is coupled between the inverting input terminal IB and the non-inverting output terminal OT of differential amplifier circuit AMP1.

Figure 7:
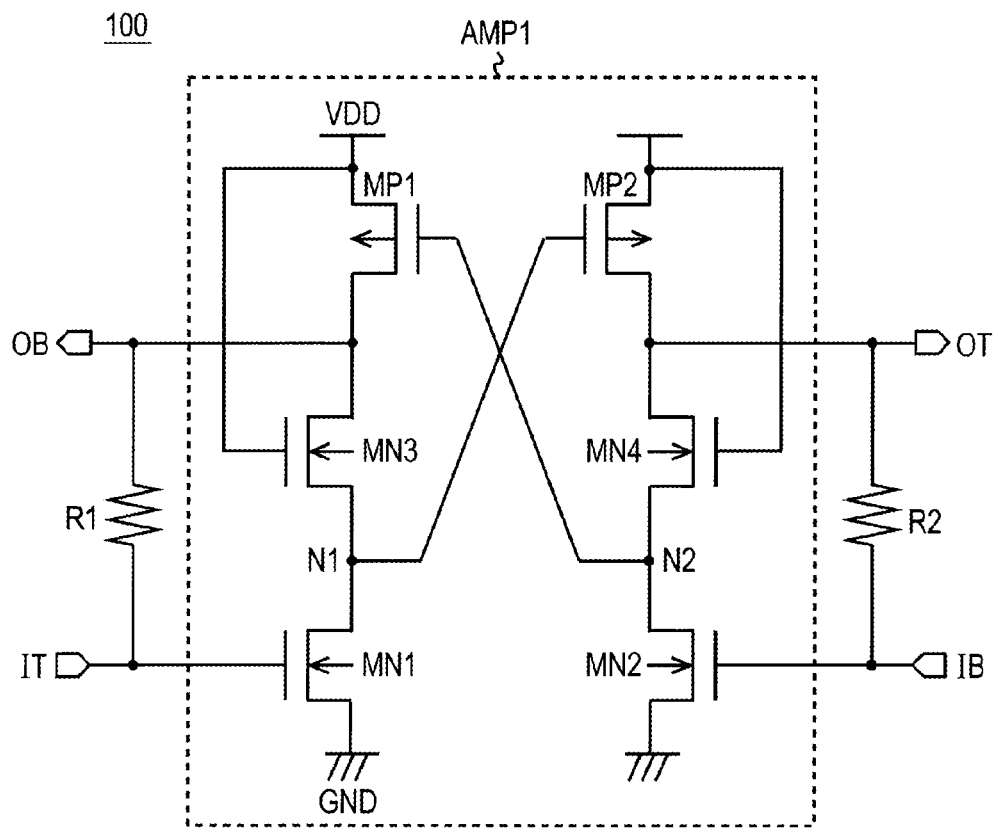
FIG. 7 is a diagram showing in detail the jitter suppression circuit of the first embodiment.

FIG. 7 shows the structure of the differential amplifier circuit AMP1. As shown in FIG. 7, the differential amplifier circuit AMP1 contains the PMOS transistors MP1, MP2, and the NMOS transistors MN1-MN4.

The source of the PMOS transistor MP1 is coupled to the supply terminal VDD, the drain is coupled to the inverting output terminal OB, and the gate is coupled to the node N2. The source of the PMOS transistor MP2 is coupled to the supply terminal VDD, the drain to the non-inverting output terminal OT, and the gate to the node N1.

The drain of the NMOS transistor MN3 is coupled to the inverting output terminal OB, the source to the node N1, and the gate to the supply terminal VDD. The drain of the NMOS transistor MN4 is coupled to the non-inverting output terminal OT, the source to the node N2, and the gate to the supply terminal VDD.

The drain of the NMOS transistor MN1 is coupled to the node N1, the source is coupled to the ground terminal GND, and the gate is coupled to the non-inverting input terminal IT. The drain of the NMOS transistor MN2 is coupled to the node N2, the source to the ground terminal GND, and the gate to the inverting input terminal IB.

Figure 8:
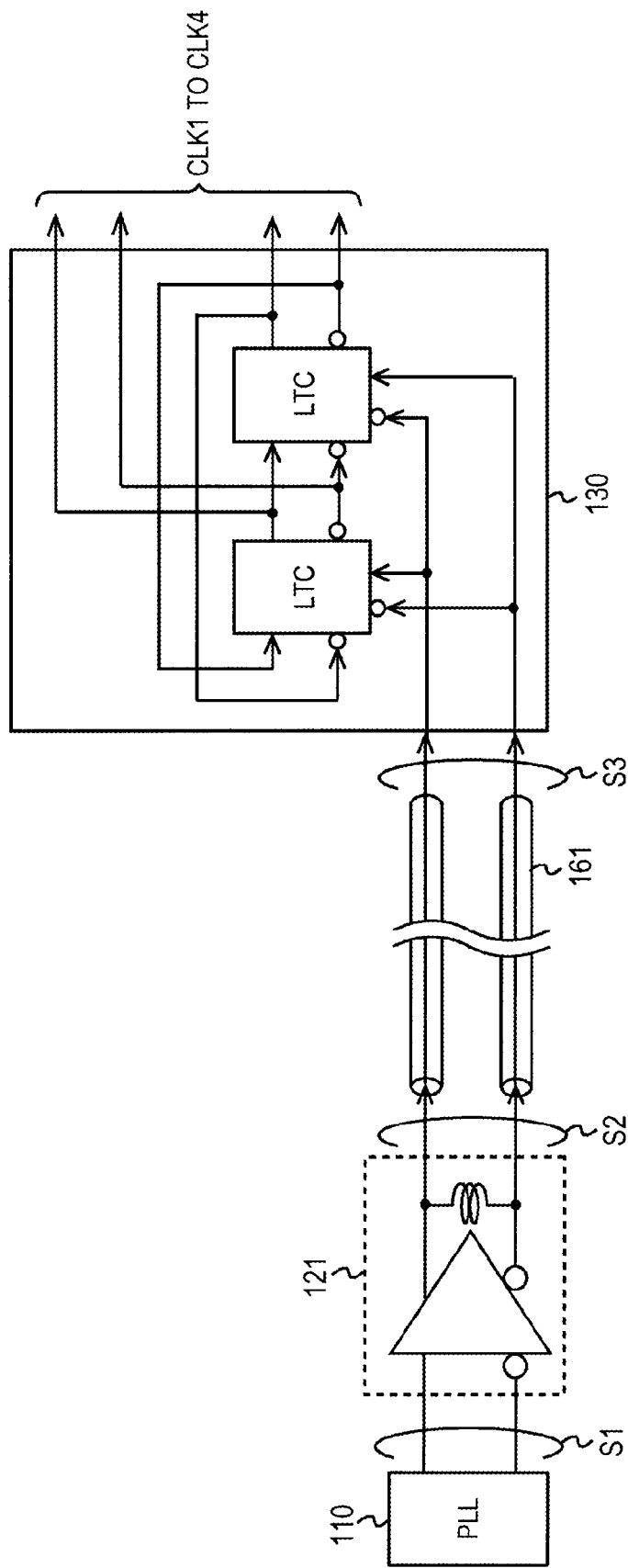
FIG. 8 is a diagram showing the structure of a reference circuit for describing the effect rendered by the jitter suppression circuit of the first embodiment.
Figure 9:
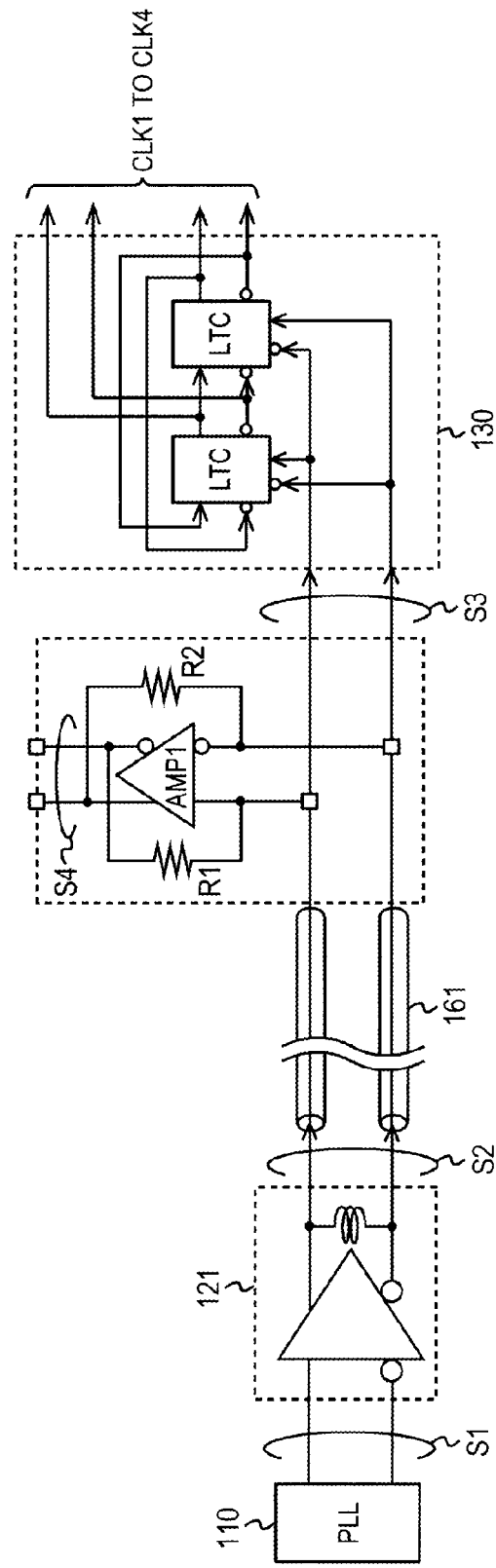
FIG. 9 is a diagram showing the circuit configuration for describing the effect rendered by the jitter suppression circuit of the first embodiment.
Figure 10:
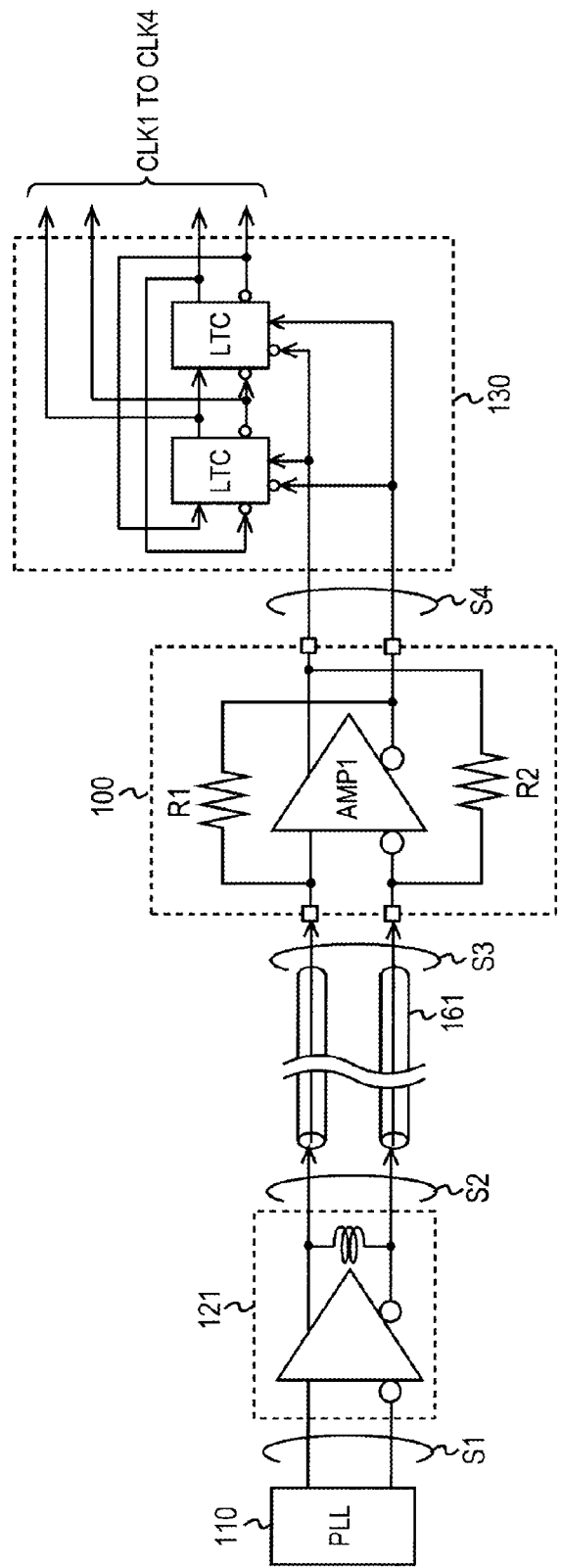
FIG. 10 is a diagram showing the circuit configuration for describing the effect rendered by the jitter suppression circuit of the first embodiment.

An example of the case where there is no jitter suppression circuit 100 installed in the SerDes circuit in FIG. 8 is shown here in order to describe the effect rendered by the first embodiment. FIG. 9 shows the structure of the SerDes circuit when the input terminal of the jitter suppression circuit 100 of the first embodiment, is coupled to the coupling node between the signal distribution wiring 161 and the divider circuit 130. Further, FIG. 10 shows the structure of the SerDes circuit when the jitter suppression circuit 100 of the first embodiment is coupled in series between the signal distribution wiring 161 and the divider circuit 130. In all of the above cases, only the PLL circuit 110, the clock driver 121, the signal distribution wiring 161, and sections of divider circuit 130 and jitter suppression circuit 100 in the transmit-receive circuit 171 are shown and all other sections are omitted in order to simplify the drawings. The wire length from the signal distribution wiring 161 to the divider circuit 130 is short enough to be ignored since the wire length is sufficiently short compared to the length of the signal distribution wiring 161 (for example 3 mm).

Figure 11:
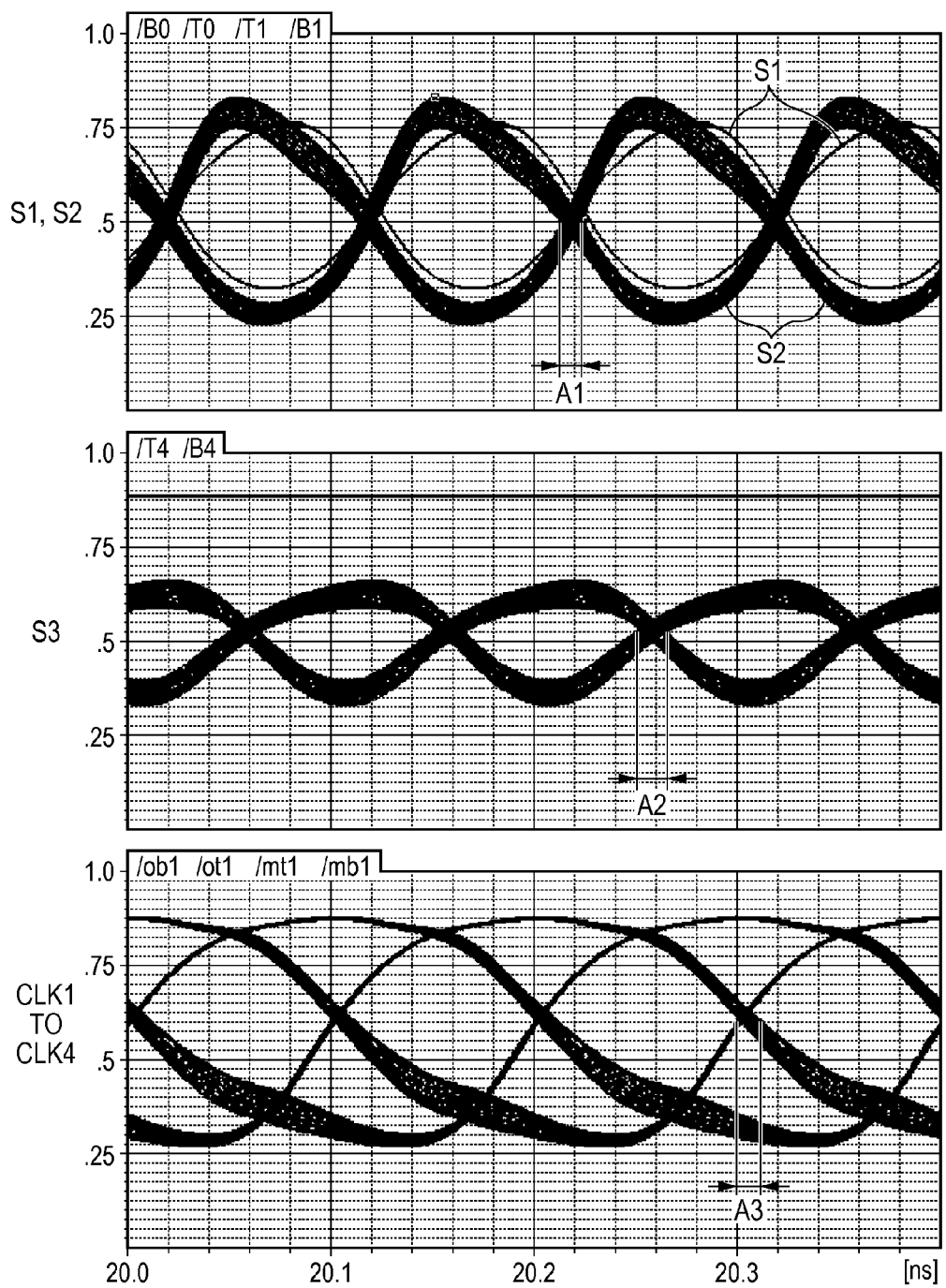
FIG. 11 is eye patterns for each signal in the circuit configuration in FIG. 8.

FIG. 11 shows the eye pattern waveform for the clock signals CLK1-CLK4 and the signals S1-S3 at each point in the circuit configuration of FIG. 8 where no jitter suppression circuit 100 is installed. The vertical axis on the graph is the voltage level [V] of the clock signal, and the horizontal axis is the time [ns (nanoseconds)]. The signal S1 is an input differential clock signal for the clock driver 121. The signal S2 is an output differential clock signal for the clock driver 121. This figure shows here the case where jitter is being superimposed on this signal S2 due to supply voltage noise in the clock driver 121. In this example, the jitter A1[ns] is superimposed on the signals.

The signal S3 shows the waveform at the node in which the signal S2 on which the jitter from power supply noise is superimposed, passes along the signal distribution wiring 161, and is input to the divider circuit 130. The jitter in signal S2 is also conveyed unchanged to this signal S3, and the jitter A2[ns] is superimposed on the signal. The clock signals CLK1-CLK4 are clock signals output by the divider circuit 130 in which the signal S3 was input. The jitter A3[ns] of the same extent as A2 is also superimposed on these clock signals CLK1-CLK4.

Figure 12:
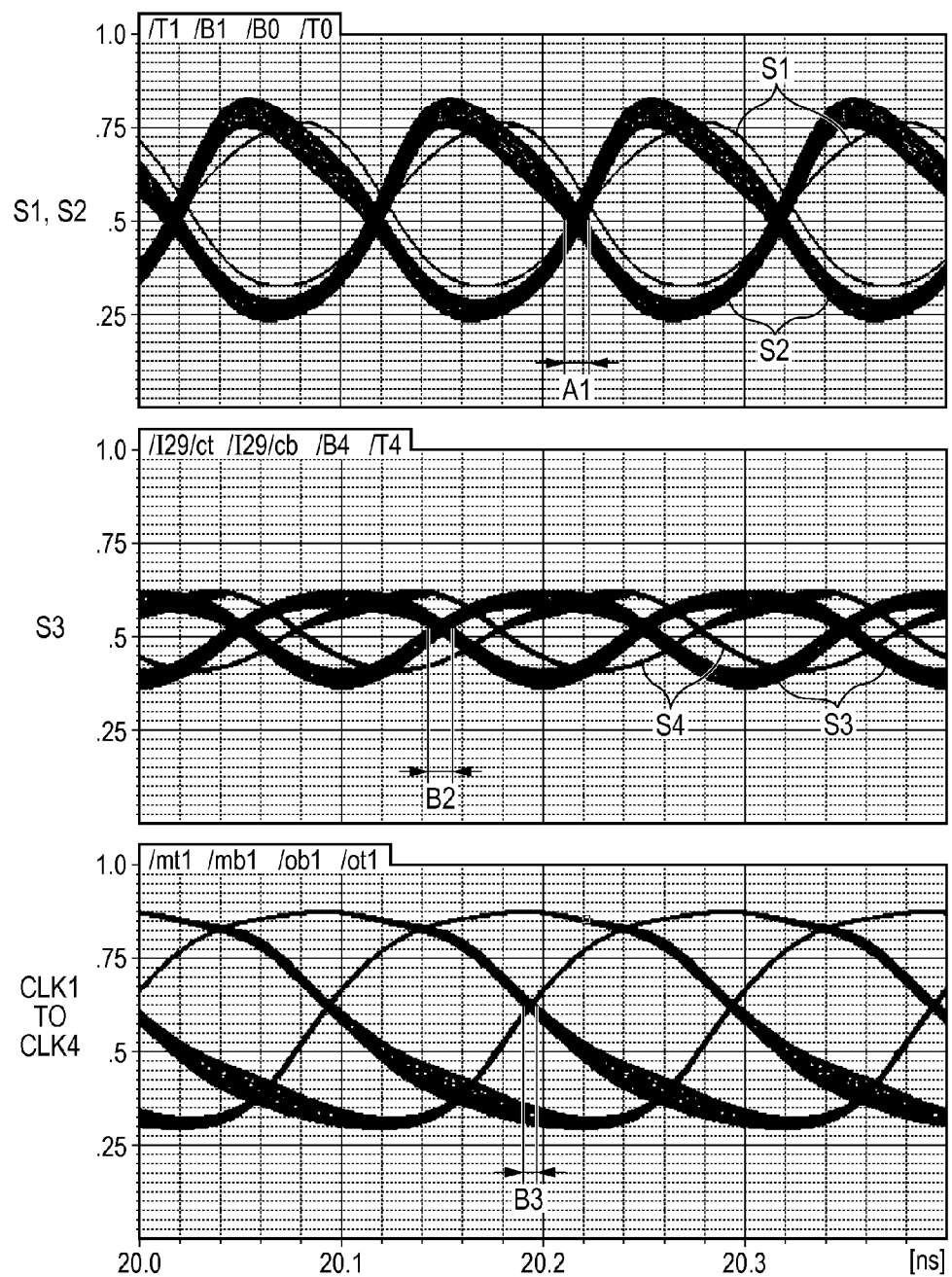
FIG. 12 is eye patterns for each signal in the circuit configuration in FIG. 9 of the first embodiment.

Next, FIG. 12 shows eye pattern waveforms for the clock signals CLK1-CLK4, and signals S1-S3 at each point in the circuit configuration of FIG. 9 of the first embodiment. The signal S1 is an input differential clock signal for the clock driver 121. The signal S2 is a differential clock signal output by the clock driver 121, and on which the jitter A1 is superimposed the same as the case in FIG. 11.

The signal S3 is a waveform at the node in which the signal is input to the divider circuit 130 and the non-inverting input terminal IT and the inverting input terminal IB of jitter suppression circuit 100 are coupled to this node.

The differential amplifier circuit AMP1 of jitter suppression circuit 100 here lowers the output level of the differential signal output to the non-inverting output terminal OT, and the inverting output terminal OB, when the input level of the differential signal input to the non-inverting input terminal IT and the inverting input terminal IB rises. Conversely, when there is a drop in the input level of the differential signal that was input, then the differential amplifier circuit AMP1 raises the output level of the output differential signal.

In the jitter suppression circuit 100 of the first embodiment, a feedback resistor R1 is coupled between the non-inverting input terminal IT and the inverting output terminal OB, and a feedback resistor R2 is coupled between the non-inverting output terminal OT and the inverting input terminal IB, of this differential amplifier circuit AMP1. Feedback is performed via the feedback resistors R1, R2 from the output side (OT, OB) to the input side (IT, IB). Therefore when the input level has risen, a force acts to lower this level, and conversely when the input level has fallen, a force acts to raise this level so that fluctuations on the input side are suppressed. Moreover, this suppressed signal from suppressing fluctuations on the input side is input to the differential amplifier circuit AMP1 so that fluctuations on the output side are suppressed even further. A specific example of suppressing these fluctuations is shown while referring to FIG. 13 and FIG. 14.

Figure 13:
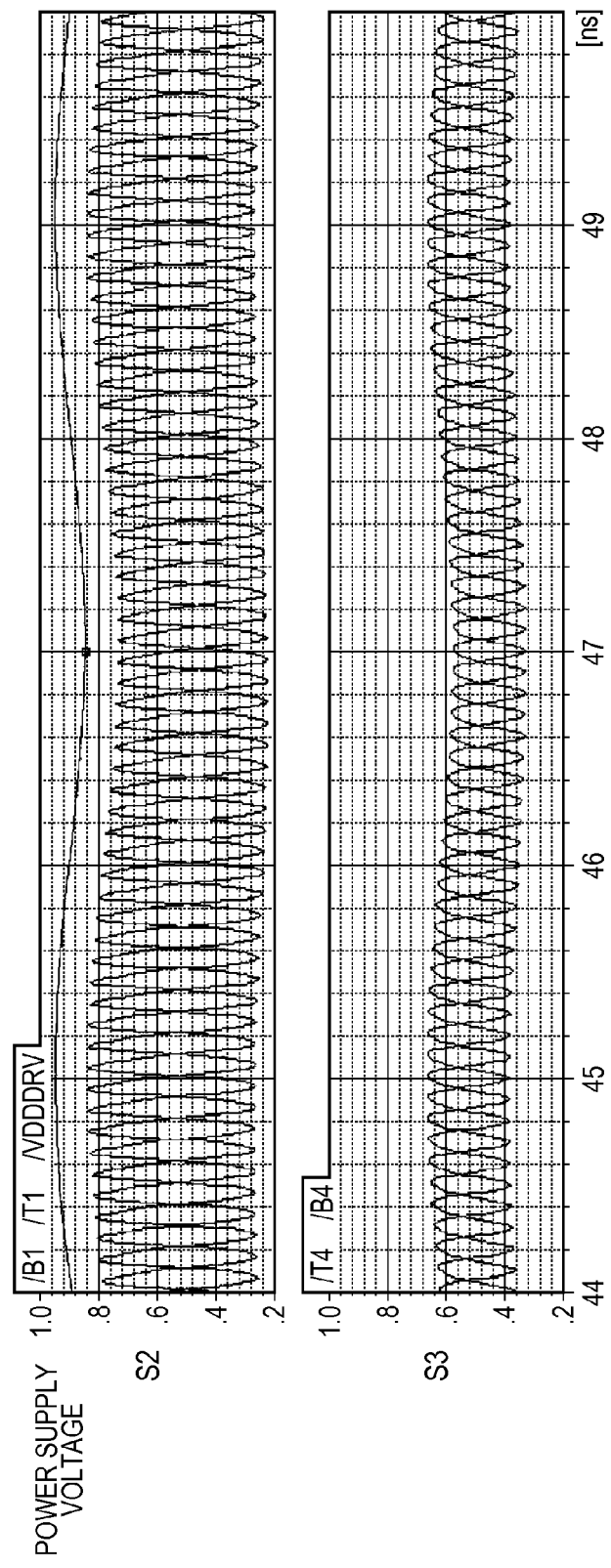
FIG. 13 is waveforms for each signal in the circuit configuration in FIG. 8.

FIG. 13 shows the signal waveforms for the signals S2, S3, and the supply voltage fluctuation waveform applied to the clock driver 121 in the circuit configuration of FIG. 8 where no jitter suppression circuit 100 is installed. FIG. 14 shows the signal waveform for the signals S2, S3, S4 and the supply voltage fluctuation waveform applied to the clock driver 121 in the circuit configuration of FIG. 9 of the first embodiment. The vertical axis in these graphs is the voltage level [V] of the clock signal, and the horizontal axis is the time [ns].

As can be observed in FIG. 13, the supply voltage applied to the clock driver 121 fluctuates due to (power supply) noise. The signal S2 output by the clock driver 121 also fluctuates according to the fluctuations due to this power supply noise, and jitter is superimposed on the signal. The voltage level in the signal S3 attenuates due to the signal distribution wiring 161 but one can observe that the fluctuations due to the power supply noise are conveyed unchanged.

Figure 14:
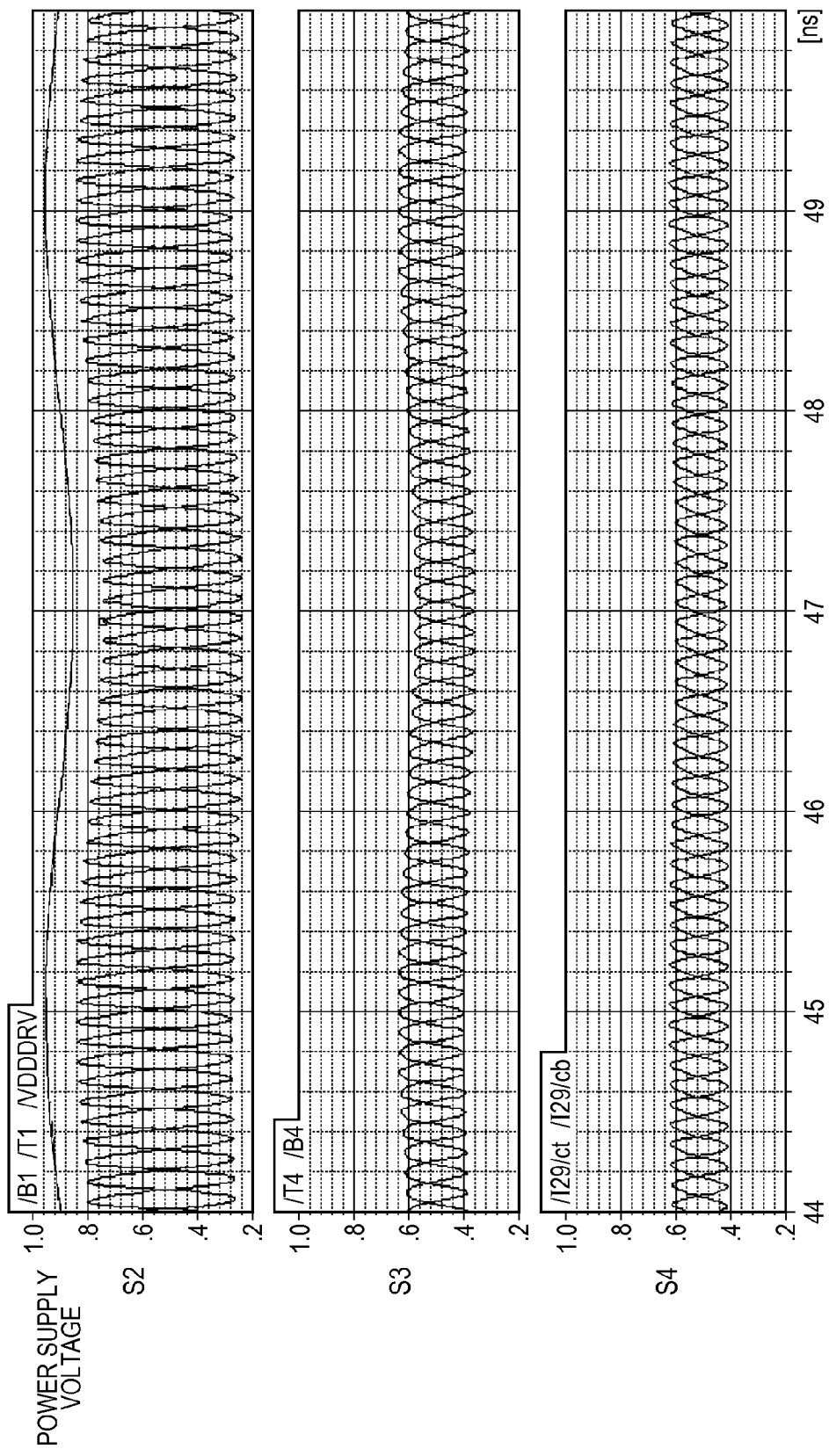
FIG. 14 is a waveform chart of each signal in the circuit configuration in FIG. 9 for the first embodiment.

However, as can be seen in FIG. 14, noise is superimposed on the signal S2 according to the swing in the supply voltage applied to the clock driver 121 even in the circuit configuration of FIG. 9 coupled to the jitter suppression circuit 100 of the first embodiment. However, one can observe that the noise due to this (voltage) swing is not conveyed unchanged to the signal S3 and is attenuated. This result is obtained because fluctuations on the input side of the jitter suppression circuit 100 are suppressed due to the above described suppression effect rendered by the jitter suppression circuit 100. An even further reduction in noise can be observed in the signal S4 (output from jitter suppression circuit 100).

When the signal S2 on which jitter is superimposed, passes along the signal distribution wiring 161 and is input to the jitter suppression circuit 100, the jitter suppression circuit 100 in this way functions to suppress fluctuations in this signal level. Consequently, the fluctuations in the signal waveform of the node input to the divider circuit 130 are in this way suppressed. The fluctuations (noise) in the signal level of the signal S3 in the first embodiment are therefore suppressed, and the jitter B2 [ns] in the signal S3 is reduced compared to the jitter A2 of FIG. 11 where there is no jitter suppression circuit 100 installed.

This signal S3 is then input to the divider circuit 130, and the divider circuit 130 outputs the clock signals CLK1-CLK4 according to the signal S3. Consequently, the jitter B3[ns] in the clock signals CLK1-CLK4 is drastically lower than the jitter A3 in FIG. 11.

The above description is for the case where a differential signal (signal S2) with superimposed noise was input to the non-inverting input terminal IT and the inverting input terminal IB of the jitter suppression circuit 100. However, the same jitter suppression effect is provided even when the noise is superimposed on the power supply of the jitter circuit 100 itself. This effect is described next.

In a differential amplifier circuit, when noise is superimposed on the power supply voltage and the supply voltage rises due to noise, the output level from the differential amplifier circuit normally increases and this output level drops when the power supply voltage falls due to noise. This action generates jitter in the output from the differential amplifier circuit.

However, in the jitter suppression circuit 100 of the first embodiment, the output side of the differential amplifier circuit AMP1 applies feedback to the input side by way of feedback resistors R1, R2. So when the output level of the differential amplifier circuit AMP1 has risen due to power supply noise, then the feedback causes a rise on the input side to consequently lower the output level of the differential amplifier circuit AMP1. Conversely, when the output level of the differential amplifier circuit AMP1 has dropped due to power supply noise, then the feedback causes a drop on the input side to consequently raise the output level of the differential amplifier circuit AMP1. The above description shows that the jitter suppression circuit 100 also renders the effect of suppressing jitter even when the noise is generated in its own power supply.

Figure 15:
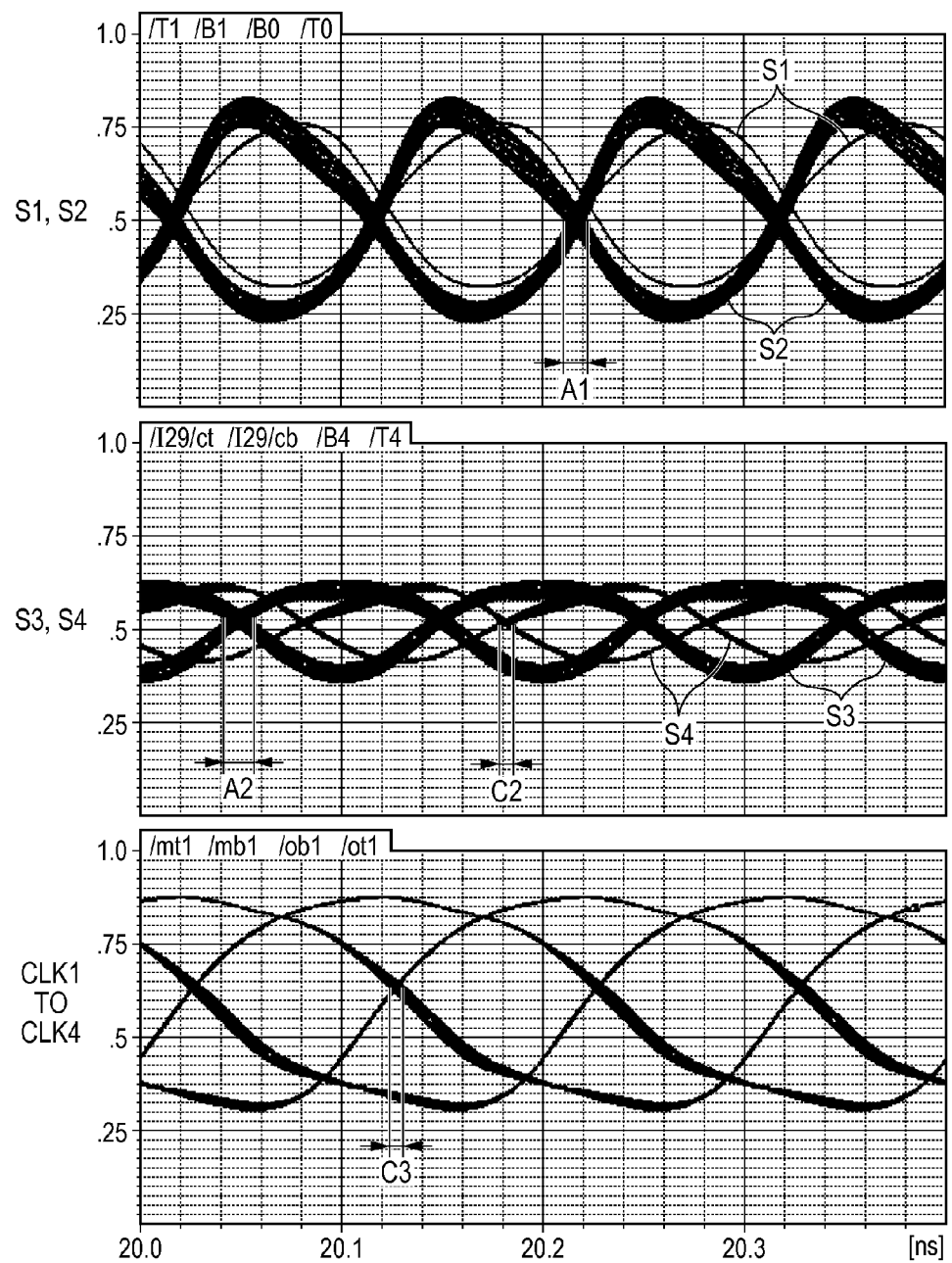
FIG. 15 is eye patterns for each signal in the circuit configuration in FIG. 10 for the first embodiment.

Next, FIG. 15 shows the eye pattern waveforms for the clock signals CLK1-CLK4, and signals S1-S3 at each point in the circuit configuration of FIG. 10 of the first embodiment. The signal S1 is the input differential signal for the clock driver 121. The signal S2 is the differential clock signal output by the clock driver 121 and the jitter A1 is superimposed on the signal S2 the same as the case in FIG. 11 and FIG. 12.

The signal S3 shows the waveform at the node in which the signal S2 passes along the signal distribution wiring 161 and is input to the jitter suppressing circuit 100. As shown in FIG. 15, noise is superimposed on the signal S2 according to the swing in the supply voltage applied to the clock driver 121, however in the signal S3 the noise due to that swing can be observed to attenuate without being conveyed unchanged. This effect occurs because the jitter suppression circuit 100 acts to lower the input level when a rise occurs in the input level and conversely to raise the input level when a drop occurs in the input level in order to suppress fluctuations on the input side. Moreover, the fluctuations on the input side are suppressed, and that suppressed signal is then input to the differential amplifier circuit AMP1 so that fluctuations on the output side are suppressed even further. Therefore, when the signal S3 superimposed with jitter is input to the jitter suppression circuit 100, then the jitter suppression circuit 100 acts to suppress those signal level fluctuations, and that fluctuation-suppressed differential signal is output from the non-inverting output terminal OT and the inverting output terminal OB of jitter suppression circuit 100 to the coupling node of the divider circuit 130 as the signal S4.

The jitter C2 [ns] of this signal S4 is an extremely small value compared to the jitter A2 of the signal S3. This signal S4 is input to the divider circuit 130, and the clock signals CLK1-CLK4 are output from the divider circuit 130 according to the signal S4. Consequently, as can also be understood from examining FIG. 15, the jitter C3 [ns] of the clock signals CLK1-CLK4 is even more drastically reduced compared to the jitter A3 of FIG. 11, and even further compared to the jitter B3 of FIG. 12.

Figure 16:
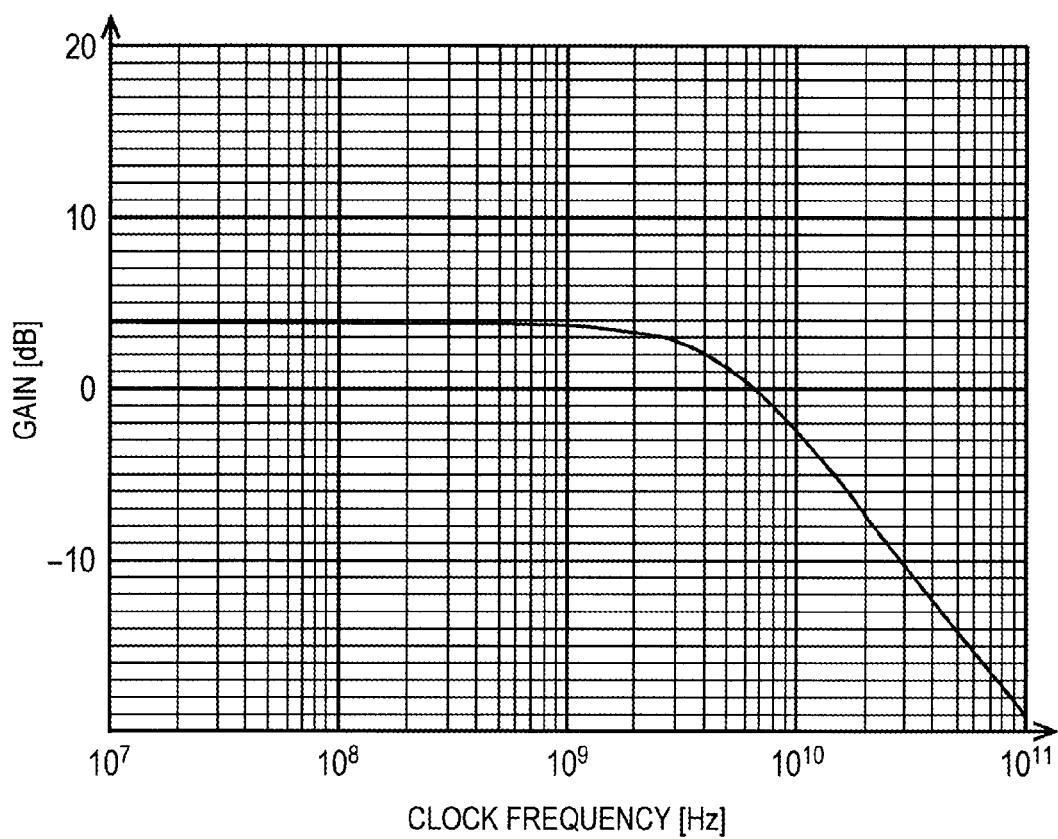
FIG. 16 is a diagram showing frequency characteristics of the gain in the jitter suppression circuit of the first embodiment.

However, FIG. 16 shows an example of the frequency characteristics of the jitter suppression circuit 100 in the circuit configuration of FIG. 10 of the first embodiment. The horizontal axis in this graph is the clock frequency [Hz] and the vertical axis is the gain [dB]. In this example, when the DC gain for example is approximately 4 dB and the clock frequency is 5 GHz, the gain becomes approximately 1 dB. The DC gain can be increased or reduced by the size of the feedback resistors R1, R2 in the jitter suppression circuit 100. Increasing the resistance values for example causes a larger DC gain, while decreasing the resistance values also causes a smaller DC gain.

Figure 17:
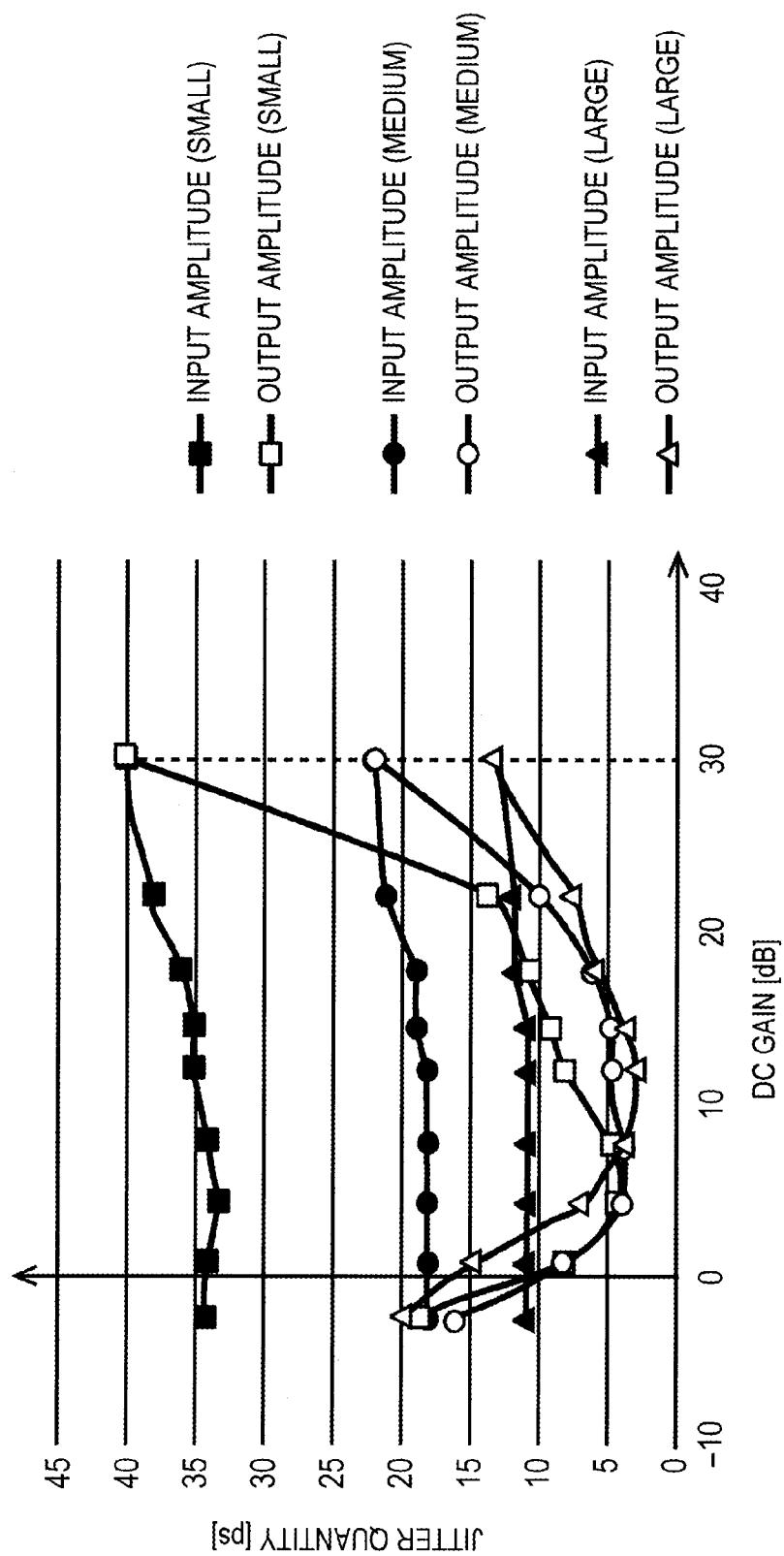
FIG. 17 is a graph plot of jitter characteristics for the DC gain in the jitter suppression circuit of the first embodiment.

Moreover, FIG. 17 shows the jitter quantity in the input-output signal for the jitter suppression circuit 100 relative to fluctuations from changes in the DC gain of the jitter suppression circuit 100 in the circuit configuration FIG. 10 of the first embodiment. The changes in the DC gain in the jitter suppression circuit 100 are made by changing the resistance values of the feedback resistors R1, R2. The horizontal axis is the DC gain [dB] and the vertical axis is the jitter [ps (picoseconds)].

This figure shows the amplitude level of the differential clock signal (signal S3) input to the jitter suppression circuit 100 grouped into three cases: the case where the amplitude level is a specified level ("medium" in the figure); the case where the amplitude level is larger than the specified value ("large" in the figure); and the case where the amplitude level is smaller than the specified value ("small" in the figure). Factors such as the output of the clock driver 121 or the length of the signal distribution wiring 161 determine the size of the amplitude level of this differential clock signal (signal S3).

As can be understood from the graph in FIG. 17, when the DC gain is small, or in other words when the feedback resistance is a low resistance value then the jitter quantity both input and output from the jitter suppression circuit 100 becomes small. Conversely, when the DC gain in the jitter suppression circuit 100 is large or in other words when the feedback resistance is a high resistance value then the jitter quantity both input and output from the jitter suppression circuit 100 becomes large. The jitter suddenly increases in particular when the DC gain larger than approximately 15 dB. However, when the feedback resistance value is made smaller (by making the DC gain larger) then the jitter quantity will increase from the vicinity of approximately 5 dB in the output of the jitter suppression circuit 100. The reason is described later on.

The suppression effect for the jitter quantity in this way varies with the size of the feedback resistor in the jitter suppression circuit 100. This jitter suppression effect becomes larger in the vicinity of a DC gain from 5 dB to 15 dB and is not affected by the amplitude of the input signal.

An approximately equivalent jitter quantity for input-output signals at a DC gain of 30 dB is a nearly infinite feedback resistance, or in other words there is an open electrical state between the input side and output sides of the jitter suppression circuit 100 and occurs because the jitter on the input side appears mostly unchanged on the output side.

When the signal level of the input differential signal affected by power supply noise fluctuates up and down, then the jitter suppression circuit 100 suppresses fluctuations in the signal level on the input side by applying feedback by way of the feedback resistors R1, R2 from the output side to the input side as already described. In this way, a signal whose signal level fluctuations were suppressed is input on the input side of the differential amplifier circuit AMP1 of the jitter suppression circuit 100. Therefore fluctuations in the signal level of the output of the differential amplifier circuit AMP1 are also suppressed.

Here, the smaller the feedback resistance value, the larger the amount of feedback from the output side to the input side of the jitter suppression circuit 100. The amount of suppression applied to fluctuations in the signal level on the input side therefore also increases, and the jitter suppression effect becomes larger. However, making the feedback resistance value even smaller makes the amount of feedback too large so that compensation is applied to the signal level in the opposite direction, causing the jitter suppression effect to weaken. This deterioration in the jitter suppression effect occurs because the output from the jitter suppression circuit 100 shown in the graph in FIG. 17 lowers the feedback resistance value (increases the DC gain) and the jitter quantity becomes large.

The amount of feedback from the output side to the input side in the jitter suppression circuit 100 therefore becomes large so that the feedback resistance value being used should be preferably be reduced as much as possible but making this value too small increases the quantity of jitter. Moreover, the more the feedback resistance is increased as already described, the more the amount of jitter increases. The amount of jitter therefore increases whether the feedback resistance is larger or smaller than the specified value so that a preferable condition for reducing the jitter amount as much as possible (or obtaining a maximum jitter suppression effect) is to set a feedback resistance where the DC gain in the jitter suppression circuit 100 is approximately 5 to 15 dB.

The jitter suppression circuit 100 of the present embodiment is therefore capable of reducing the jitter quantity in the conveyed signal without using an analog circuit filter utilizing a capacitor as described in the related art technology in patent documents 1 and 2, and also prevents use of circuit components requiring usage of a larger surface area. Consequently, a larger area semiconductor chip does not have to be utilized to accommodate this jitter suppression circuit 100, and the product cost can also be lowered. Moreover only a feedback resistance is applied by the resistor components so that there is no lowering of the jitter suppression effect in the low frequency range of the clock signal.

Moreover, in the technology disclosed in patent documents 1 and 2, the signal passed from input to output through a filter and a plurality of amplifier circuits arranged in series. The related art therefore has the problem that signal delay occurs due to the amplifier circuits and other components that the signal passes through and that the jitter generated by the amplifier circuit itself is added to the signal that is output. In the jitter suppression circuit 100 of the present embodiment however the jitter suppression circuit 100 renders the effect of suppressing its own jitter, and can therefore prevent the above mentioned problems from occurring.

Figure 18:
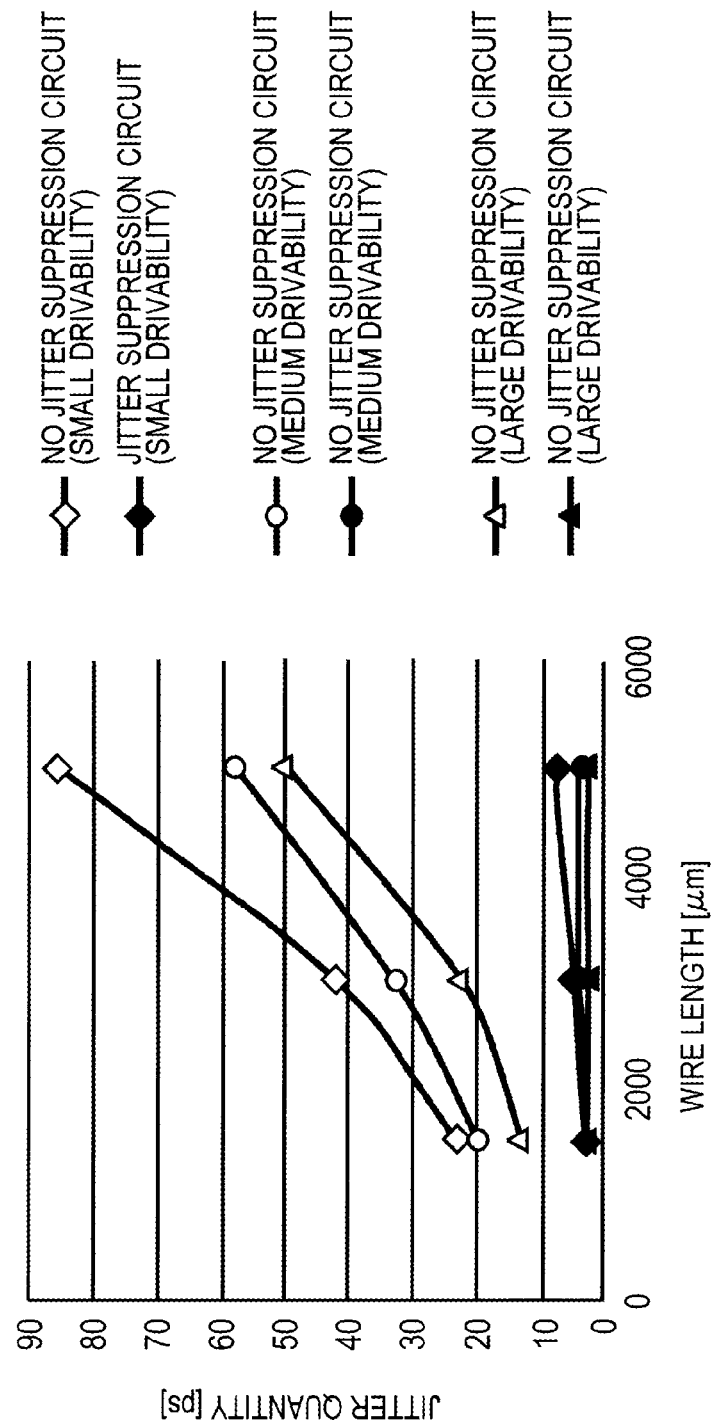
FIG. 18 is a graph plot of jitter characteristics for the wiring length of the signal distribution wiring in the SerDes circuit of the first embodiment.

FIG. 18 shows the amount of jitter in the output signal from the jitter suppression circuit 100 relative to changes made in the wire length of the signal distribution wiring 161 while the DC gain is fixed at a specified value in the jitter suppression circuit 100 with the circuit configuration of FIG. 10. The horizontal axis is the wire length [μm], and the vertical axis is the jitter [ps (picoseconds)]. The jitter for circuit configuration of FIG. 8 or namely the structure where there is no jitter suppression circuit 100 is shown at the same time. In FIG. 18, the circuit configuration of FIG. 10 is described as "Jitter suppression circuit", and the circuit configuration of FIG. 8 is described as "No jitter suppression circuit".

This figure plots the drivability of the clock driver 121 for the cases of large, medium, and small (each shown as "large drivability", "medium drivability", and "small drivability" in FIG. 18). A small drivability for the clock driver 121 is indicated as "1", a medium drivability is 1.5 times that quantity, and a large drivability is 3 times that quantity.

As can be seen from the graph for the circuit configuration in FIG. 8 containing no jitter suppression circuit 100, the larger the drivability of the clock driver 121, the smaller the amount of jitter. Moreover, the shorter the wire length of the signal distribution wiring 161 is made, the smaller the amount of jitter.

Generally, in a driver amplifier such as the clock driver 121 used here, the larger the drivability the larger the power consumption, and also a larger surface area is required. However, the output clock signal amplitude becomes larger as the drivability becomes larger so that the percentage of effects sustained from power supply noise, and the amount of jitter are also small as shown in FIG. 18. Conversely, the smaller the drivability, the larger the jitter quantity becomes.

Also, the longer the wire length of the signal distribution wiring 161, the smaller the amplitude due to attenuation of the clock signal output from the clock driver 121. The percentage of effects sustained from power supply noise is therefore large, and the amount of jitter becomes large. Conversely the shorter that the wire length is made the shorter the jitter quantity.

However, as can be understood from FIG. 18, even if the drivability of the clock driver 121 is increased, there is no significant change in the jitter amount in the circuit configuration of FIG. 10 in which the jitter suppression circuit 100 of the present embodiment is installed, compared to the case where no jitter suppression circuit 100 was installed. Likewise, even if the wiring length of the signal distribution wiring 161 was lengthened, there was no significant change in the amount of jitter in the same way.

The above results show that compared to the case where there is no jitter suppression circuit 100, a circuit configuration of the clock distribution system containing a clock driver 121, and signal distribution wiring 161 coupled to that clock driver 121 as shown in FIG. 1 or FIG. 3, is capable of reducing the amount of jitter even if the drivability of the clock driver 121 was reduced to a small level. The power consumption and the circuit surface area of the SerDes circuit SD1 can therefore be reduced. Moreover, the amount of jitter can be reduced in the same way even if the wire length of the signal distribution wiring 161 was lengthened. The number of wires coupled subordinate to clock driver can therefore be reduced, and a large effect obtained from lowering power consumption in the SerDes circuit SD1 and from reducing the circuit surface area.

Figure 19:
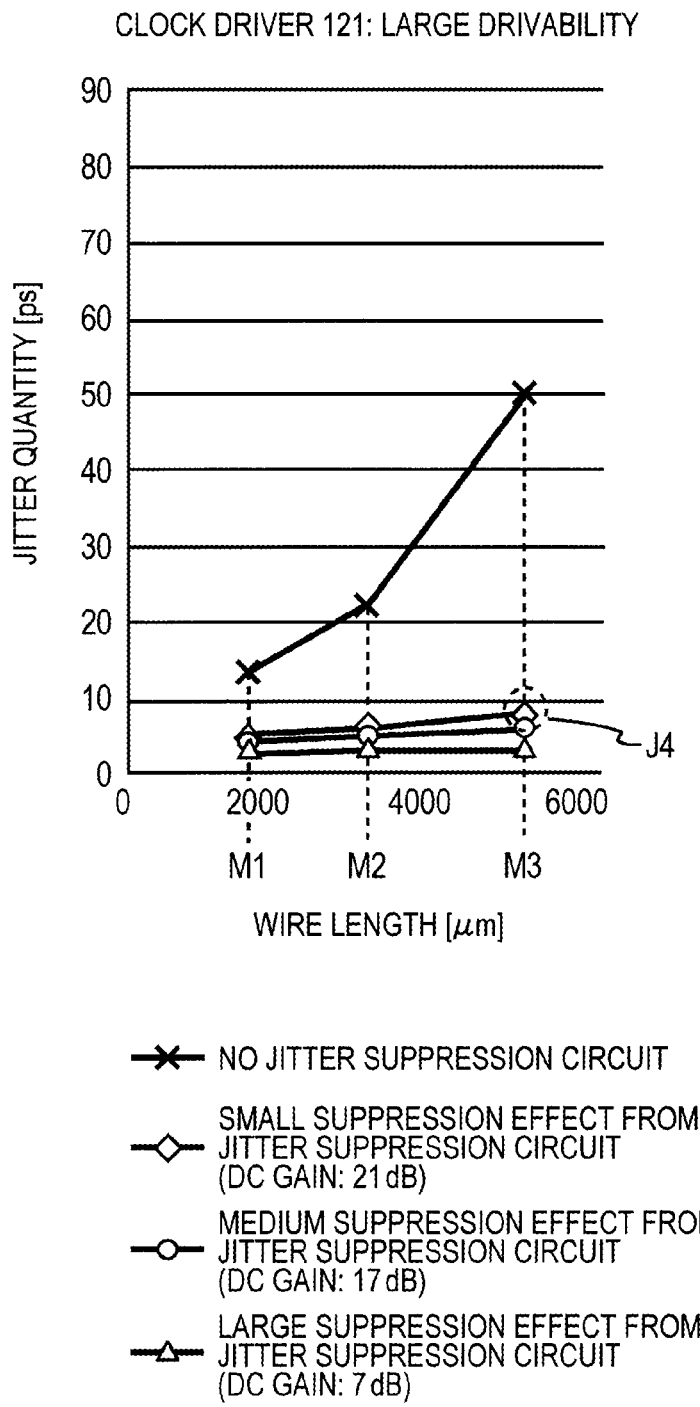
FIG. 19 is a graph for describing fluctuations in the amount of jitter according to the suppressive effect rendered by the jitter suppression circuit in the SerDes circuit of the first embodiment.
Figure 20:
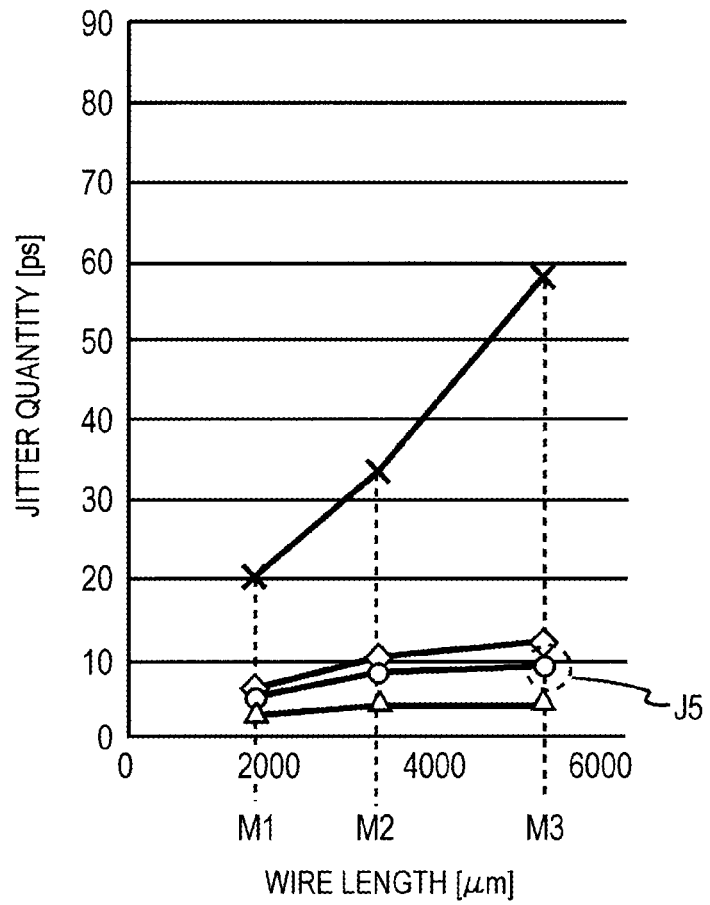
FIG. 20 is a graph for describing fluctuations in the amount of jitter according to the suppressive effect rendered by the jitter suppression circuit in the SerDes circuit of the first embodiment.
Figure 21:
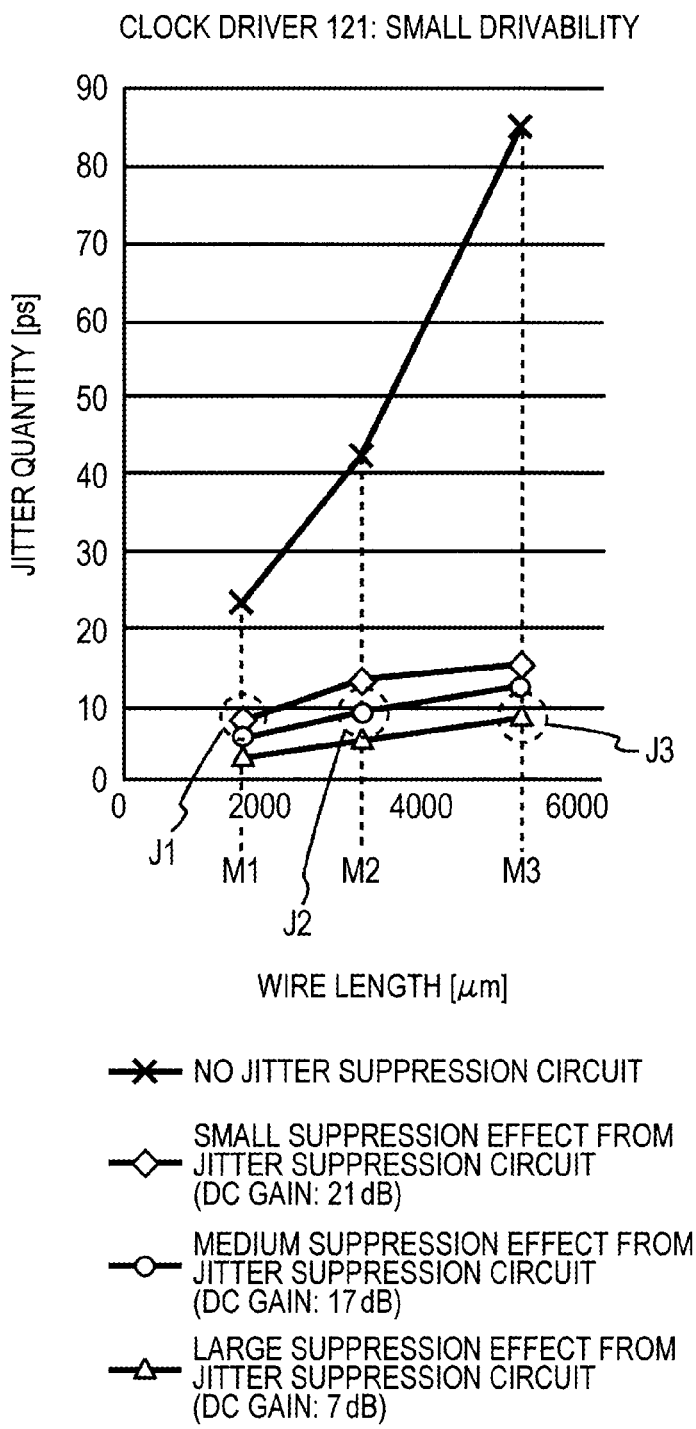
FIG. 21 is a graph for describing fluctuations in the amount of jitter according to the suppressive effect rendered by the jitter suppression circuit in the SerDes circuit of the first embodiment.

FIG. 19 through FIG. 21 show graphs for each of the cases of a large, medium and small drivability in the clock driver 121, that plot the amount of jitter relative to the wiring length of the signal distribution wiring 161 in the case where the jitter suppression effects for the jitter suppression circuit 100 are large, medium, and small; and also for the case where there is no jitter suppression circuit 100 (circuit configuration in FIG. 8). Here, a small drivability for the clock driver 121 is indicated as "1", a medium drivability is 1.5 times that quantity, and a large drivability is 3 times that quantity, the same as described for the large, medium, and small drive capabilities of the clock driver 121 in FIG. 18. Also, the jitter suppression effect rendered by the jitter suppression circuit 100 can be implemented by adjusting the values of the feedback resistors R1, R2 to change the DC gain as described above. In the case of a large jitter suppression effect, the DC gain value is set to 7 dB, in the case of a medium jitter suppression effect, the DC gain value is set to 17 dB, and in the case of a small jitter suppression effect the DC gain value is set to 21 dB. The size of the jitter suppression effect rendered by the jitter suppression circuit 100 can also be interpreted as a jitter suppression coefficient.

In the respective structures in FIG. 19 through FIG. 21 where the circuit configuration does not utilize a jitter suppression circuit 100, the amount of jitter also increases as the wire length of the signal distribution wiring 161 becomes longer to the lengths M1 through M3 [μm]. However if using the jitter suppression circuit 100 of the present embodiment, then increasing the jitter suppression effect of the jitter suppression circuit 100 to match the wire lengths that reached the long lengths of M1 through M3 [μm] will maintain the amount of jitter within approximately a fixed quantity.

The case where the drivability of the clock driver 121 is small, and the jitter amount is largest is for example described while referring to FIG. 21. In the case of a circuit configuration not utilizing the jitter suppression circuit 100 in FIG. 21, the amount of jitter increases as the wiring lengths M1 through M3 [μm] become longer. However, if the jitter suppression circuit 100 of the first embodiment is utilized then the jitter suppression effect from utilizing the jitter suppression circuit 100 will be: a jitter amount J1 as the small jitter suppression effect rendered by the jitter suppression circuit 100 with a wire length of M1 (small wire length): a jitter amount J2 for a medium suppression effect rendered by the jitter suppression circuit 100 at a wire length of M2 (medium wire length); and a jitter amount J3 as a large jitter suppression effect rendered by the jitter suppression circuit 100 with a wire length of M3 (large wire length) so that the jitter amount is nearly the same value.

Therefore, as shown above, with the drivability of the clock driver 121 at a fixed value, the jitter suppression effect (suppression coefficient) of the jitter suppression circuit 100 can be increased as the wire length of the signal distribution wiring 161 becomes longer so that the jitter amount can be suppressed to within a specified value.

If the wire length of the signal distribution wiring 161 is a fixed length such as the wire length of M3 [µm], then as can be seen from FIG. 19 through FIG. 21, the smaller the drivability of clock driver 121, the larger the amount of jitter. However, if using the jitter suppression circuit 100 of the first embodiment, then the jitter suppression effect rendered by the jitter suppression circuit 100 set for small, medium, and large according to the large, medium, and small capabilities of the clock driver 121 can maintain the jitter amounts J4, J5, J3 mostly within their specified amounts.

When the wire length of the signal distribution wiring 161 is a fixed length, then the jitter amount can be maintained within a specified value as the drivability of the clock driver 121 becomes smaller by setting a larger jitter suppression effect (suppression coefficient) rendered by the jitter suppression circuit 100 in this way.

Therefore, the larger the jitter suppression effect (suppression coefficient) rendered by the jitter suppression circuit 100, the longer that the wire length of the signal distribution wiring 161 can be extended. Moreover, the larger the jitter suppression effect (suppression coefficient) rendered by the jitter suppression circuit 100, the smaller the drivability that can be set for the clock driver 121, and further the SerDes circuit SD1 can also have a smaller power consumption and utilize a smaller circuit surface area.

The Japanese Unexamined Patent Application Publication No. 2007-202147 discloses technology for a high-gain, wide-band trans-impedance amplifier. In this high-gain, wide-band trans-impedance amplifier, a feedback resistor is coupled between the input side and output side of the differential amplifier circuit however this technology assumes use of a high-gain amplifier and so a large feedback resistance must be selected as a precondition. A large feedback resistance must therefore be selected and unlike jitter suppression circuit 100 of the first embodiment this technology doesn't utilize a feedback resistance limited to a specified value as described above, and provides no indicative description.

The high-gain, wide-band trans-impedance amplifier disclosed in Japanese Unexamined Patent Application Publication No. 2007-202147 moreover obtains gain by coupling a plurality of amplifier circuits in multiple stages. However in this case, this jitter in the signal being sent increases along with the number of coupled stages and therefore this configuration is impossible to apply as a jitter suppression circuit.

In view of the above circumstances, the high-gain, wide-band trans-impedance amplifier disclosed in Japanese Unexamined Patent Application Publication No. 2007-202147 cannot fulfill the objects of the present invention which are to reduce jitter while preventing use of a larger surface area by the circuit components. The jitter suppression circuit 100 of the present embodiment and the high-gain, wide-band trans-impedance amplifier disclosed in Japanese Unexamined Patent Application Publication No. 2007-202147 possess different structures.

Second Embodiment

The second embodiment of the present invention is described in detail next while referring to the drawings. In the second embodiment the embodiment is applied to a jitter suppression circuit contained within the SerDes circuit, the same as in the first embodiment.

Figure 22:
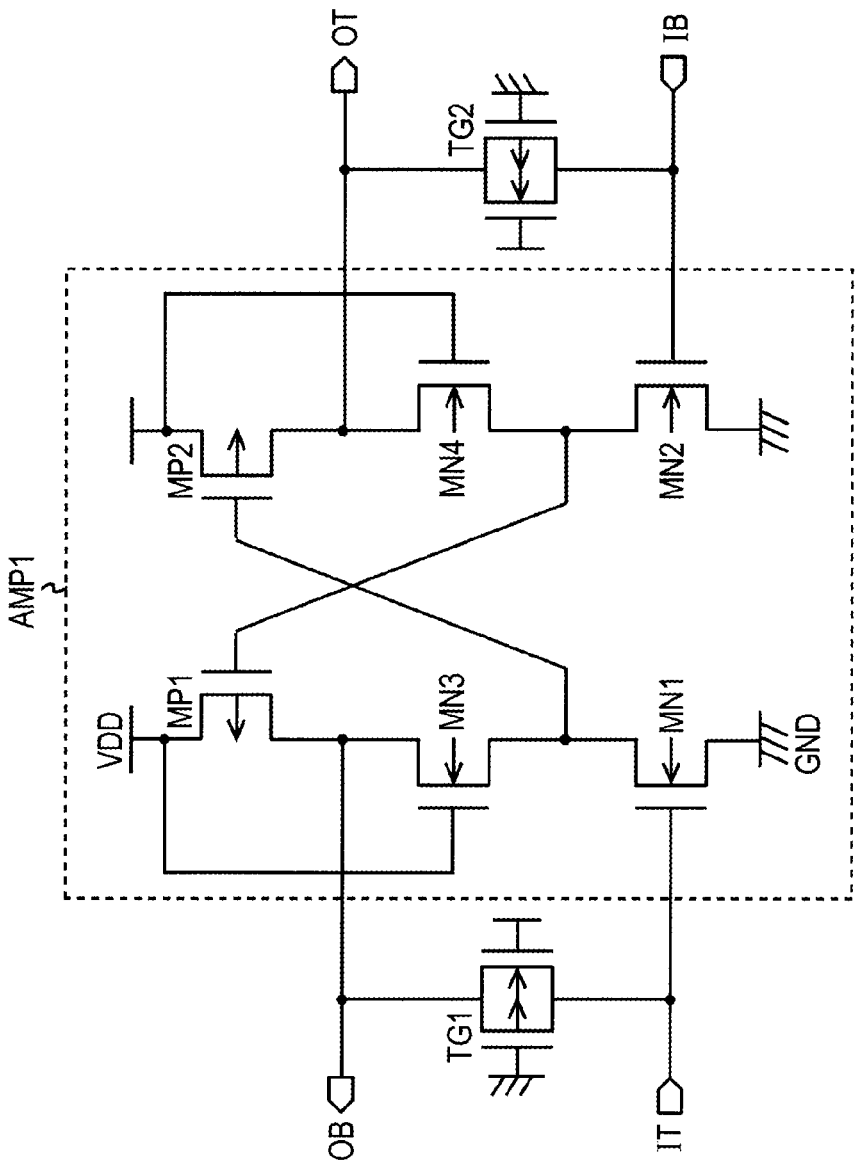
FIG. 22 is a diagram showing the structure of the jitter suppression circuit of the second embodiment.

FIG. 22 is a circuit diagram showing the structure of the jitter suppression circuit 200 of the second embodiment. The jitter suppression circuit 200 as shown in FIG. 22 includes a differential amplifier circuit AMP1, and the transfer gates TG1, TG2.

In the differential amplifier circuit AMP1, one differential clock signal is input to the non-inverting input terminal IT, and the other signal is input to the inverting input terminal IB. The differential amplifier circuit AMP1 outputs an output differential signal from the non-inverting output terminal OT and the inverting output terminal OB according to the differential clock signals that were input to the non-inverting input terminal IT and inverting input terminal IB.

The transfer gate TG1 is coupled between the inverting output terminal OB and the non-inverting input terminal IT of the differential amplifier circuit AMP1. The transfer gate TG1 is coupled between the non-inverting output terminal OT and the inverting input terminal IB of the differential amplifier circuit AMP1.

The configuration of the differential amplifier circuit AMP1 is identical to that shown in FIG. 7 so a description is omitted here.

In the second embodiment, as described above, the transfer gates TG1, TG2 are respectively substituted for the feedback resistances R1, R2 of the first embodiment. The transfer gates TG1, TG2 are comprised of MOS transistors and so can be mounted in a small surface area over the semiconductor chip compared to the resistor components. The second embodiment can therefore be implemented on a small circuit scale compared to the case where using the feedback resistors R1, R2, and in this way further serve to prevent increasing the chip surface area of the semiconductor chip where the jitter suppression circuit 200 is mounted, and the product cost can be further reduced.

Figure 23:
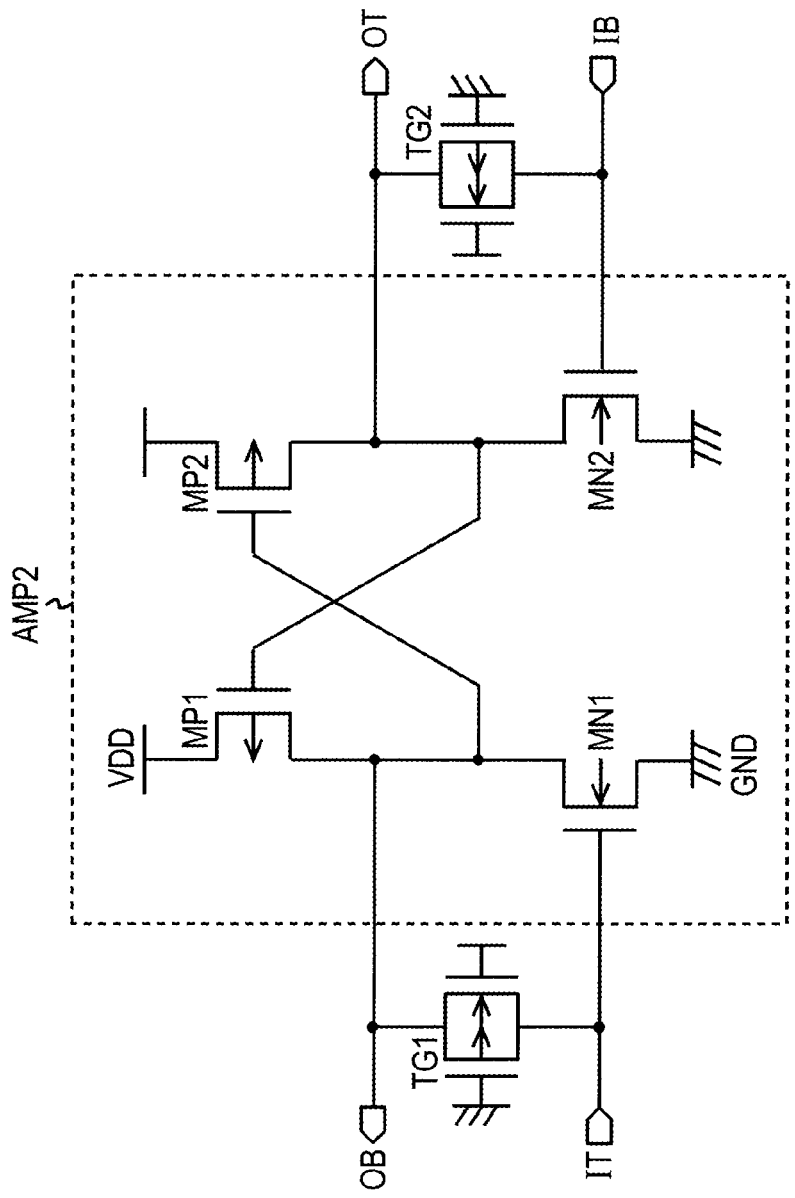
FIG. 23 is a diagram showing the structure of the jitter suppression circuit of the second embodiment.

The differential amplifier circuit AMP1 may also be utilized as the differential amplifier circuit AMP2 having the circuit configuration as shown in FIG. 23. The differential amplifier circuit AMP2 is a configuration in which the NMOS transistors MN3, MN4 of the differential amplifier circuit AMP1 have been eliminated. The response speed becomes lower compared to the differential amplifier circuit AMP1 however the circuit scale can be reduced since the NMOS transistors MN3, MN4 have been eliminated. The differential amplifier circuit AMP2 may also be utilized instead of the differential amplifier circuit AMP1 even in the first embodiment.

Third Embodiment

The third embodiment of the present invention is described in detail next while referring to the drawings. The third embodiment is the embodiment in which the present invention is applied to a jitter suppression circuit contained within the SerDes circuit, the same as in the first embodiment.

Figure 24:
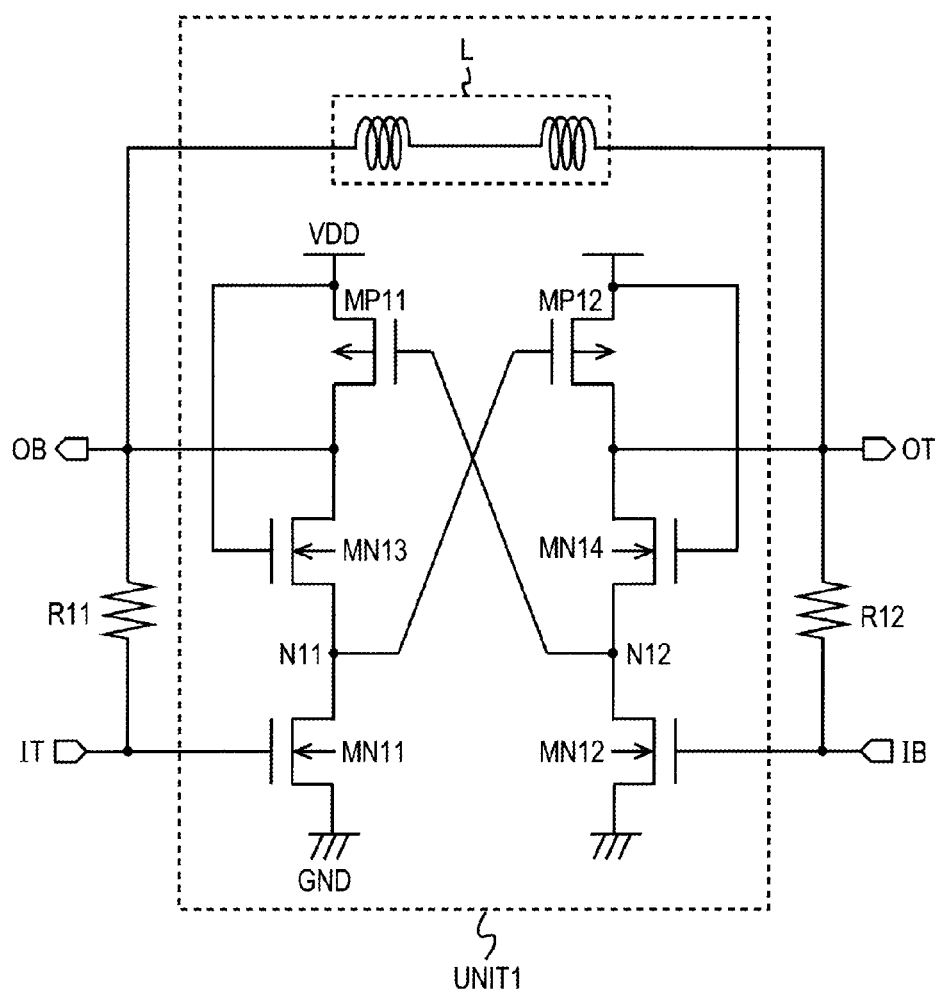
FIG. 24 is a diagram showing the structure of the clock driver of the third embodiment.

In the third embodiment, the clock driver 121 of the first embodiment has the structure as shown in FIG. 24. The clock driver 122 possesses the same structure as the clock driver 121 so a description is omitted here.

The clock driver 121 of the third embodiment is comprised of the PMOS transistor MP11, MP12, and NMOS transistors MN11-MN14, the feedback resistors R11, R12, and the inductor L as shown in FIG. 24. The feedback resistor R11 is coupled between the non-inverting input terminal IT and the inverting output terminal OB. The feedback resistor R12 is coupled between the inverting input terminal IB and the non-inverting output terminal OT. The other coupling structures are the same as FIG. 2 so a description is omitted here.

Other than also possessing an inductor L, the structure of the clock driver 121 as shown in FIG. 24 is identical to the jitter suppression circuit 100 in FIG. 7. The clock driver 121 therefore possesses a structure that applies feedback to the output signal by way of the feedback resistors R11, R12, the same as the jitter suppression circuit 100. The same effect in suppressing jitter in the signal that was output can be rendered the same as in the jitter suppression circuit 100, even if a differential signal on which jitter is superimposed for some reason is input to the PLL circuit 110, or even if noise is being conveyed from the power supply for the clock driver 121. The clock driver 121 can therefore reduce jitter in the differential clock signal that was output to the signal distribution wiring 161. The structural section of the UNIT1 enclosed by the dashed lines is equivalent to the clock driver 121 in FIG. 2.

As described above, the third embodiment can reduce jitter on the transmit side for the signal distribution wiring 161, 162 by way of the clock drivers 121, 122 having a structure identical to the jitter suppression circuit 100, and can effectively implement jitter suppression within the clock propagation system of the SerDes circuit by joint use along with jitter suppression circuits on the receive side in the first and second embodiments.

The present invention is not limited to the above described embodiments and all manner of adaptations and variations no departing from the scope and spirit of the invention are allowable. In the first through the third embodiments for example, the present invention was applied to the clock propagation type system of a SerDes circuit, however the present invention is not limited to a SerDes circuit, and may also be applied to a clock propagation system for distributing general-purpose clock signals such as shown in FIG. 25.

Figure 25:
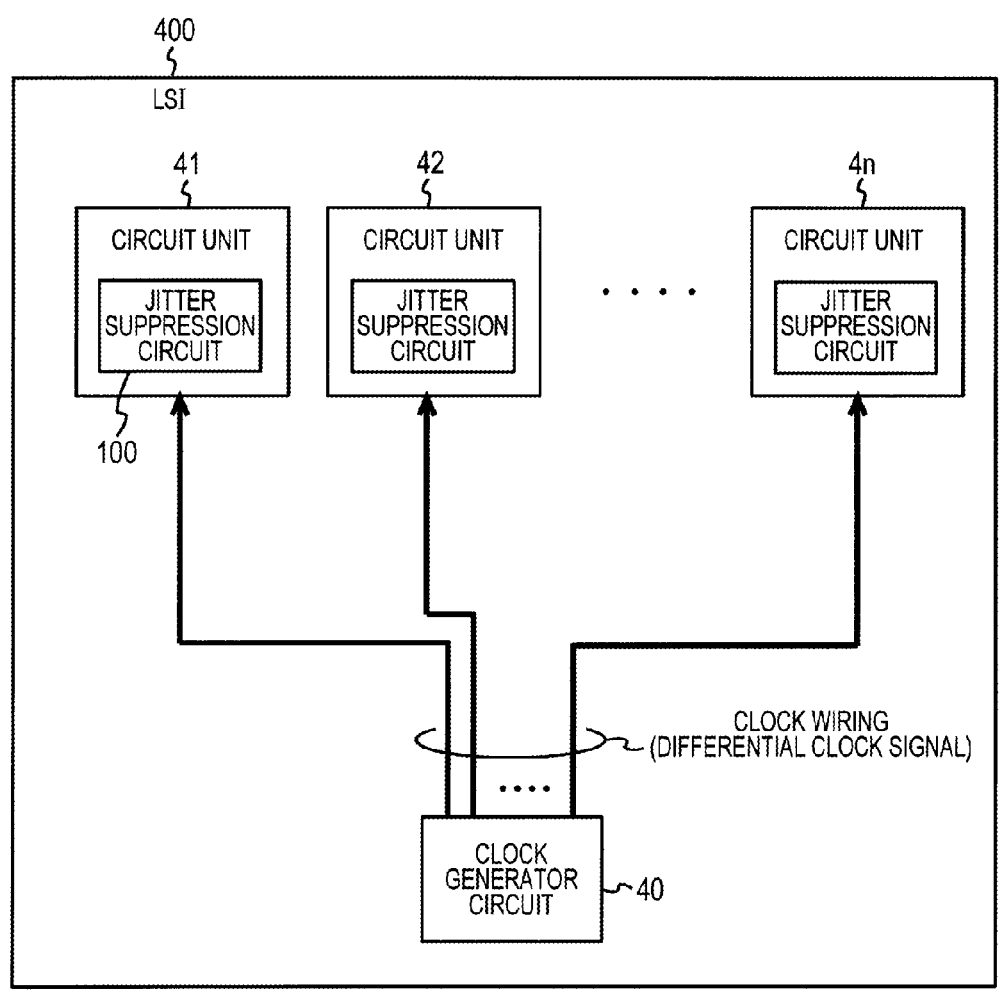
FIG. 25 is a block diagram showing the structure of the semiconductor integrated circuit of the other embodiments.
Figure 26:
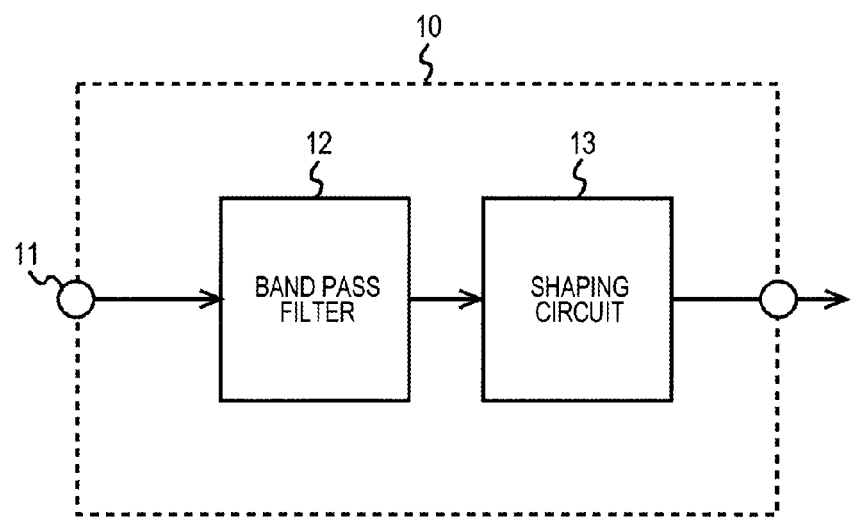
FIG. 26 is a diagram showing the circuit configuration of the technology of the related art.
Figure 27:
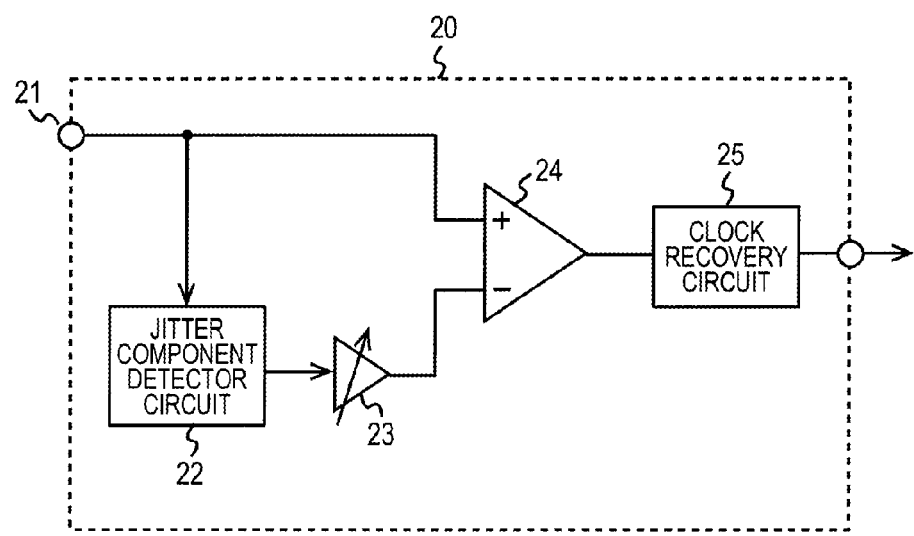
FIG. 27 is a diagram showing the circuit configuration of the technology of the related art.

As shown in FIG. 25, the circuit units 41-4n (n: natural integer) within the semiconductor integrated circuit (LSI) 400 each contain a jitter suppression circuit 100. The clock generator circuit 40 distributes clock signals by way of the clock distribution wiring to the circuit units 41-4n. If jitter has been superimposed on these clock signals conveyed by the clock distribution wiring then this jitter can be removed by the jitter suppression circuit 100 as described in the first embodiment. The embodiment can therefore prevent a deterioration in quality due to jitter in the operating clocks used in the circuit units 41-4n. The differential clock signals are conveyed by the clock distribution wiring as described in the first embodiment.

Signals where jitter is suppressed are not limited to clock signals and may also include data signals. For example, high-speed data transmit circuits such as the SerDes circuit must drive high wiring parasitic capacitance loads and so must consume large quantities of electrical current. When the current consumption is large due to these needs, then a large electrical current supply load is imposed on the power supply, also causing large power supply noise. The effects of this power supply noise also increase the jitter in the data output signal from the high-speed data transmit circuit. Utilizing the jitter suppression circuit 100 of the present invention also on the data signal transmission system is an extremely effective scheme for suppressing jitter in the data output signal. Moreover, the invention can also be used not only in the data transmission unit but also in high-speed data receiving circuits for SerDes circuits so that the invention renders the effect of suppressing jitter that is caused by power supply noise in the receiving circuits.

What is claimed is:

1. A signal wiring system comprising:
an output unit that outputs a differential signal;
a receiver unit that receives the differential signal from the output unit;
a jitter suppression circuit that suppresses a jitter amount in the differential signal received by the receiver unit according to a suppression coefficient; and
a signal wiring unit that conveys the differential signal from the output unit to the receiver unit and includes a wiring length set according to the suppression coefficient in the jitter suppression circuit.

2. The signal wiring system according to claim 1, wherein the differential signal output by the output unit includes a clock signal, and
wherein the signal wiring unit includes clock distribution wiring that distributes the clock signal to the receiver unit.

3. The signal wiring system according to claim 1, wherein the jitter suppression circuit includes:
a differential amplifier circuit that inputs, to an inverting input terminal and to a non-inverting input terminal, the differential signal conveyed by way of the signal wiring unit, and outputs, to an inverting output terminal and to a non-inverting output terminal, an output signal according to that input differential signal;
a first feedback resistor unit coupled between the inverting input terminal and the non-inverting output terminal; and
a second feedback resistor unit coupled between the non-inverting input terminal and the inverting output terminal, and
wherein the suppression coefficient is determined according to resistance values of the first and the second feedback resistor units.

4. The signal wiring system according to claim 3, wherein the inverting input terminal and the non-inverting input terminal of the differential amplifier circuit are coupled to the signal wiring unit; and
wherein the inverting output terminal and the non-inverting output terminal of the differential amplifier circuit are coupled to the receiver unit.

5. The signal wiring system according to claim 3, wherein the inverting input terminal and the non-inverting input terminal of the differential amplifier circuit are coupled to the signal wiring unit at first and the second nodes coupled to the receiver unit.

6. The signal wiring system according to claim 3, wherein the first and second feedback resistor units include at least one element that is chosen from a resistance element and a transfer gate.

7. The signal wiring system according to claim 1, wherein the output unit includes an output driver that generates the differential signal, and
wherein the output driver includes:
a differential amplifier circuit to input, to an inverting input terminal and a non-inverting input terminal, the differential signal from a previous stage, and to output, to an inverting output terminal and to a non-inverting output terminal, an output signal according to that input differential signal, a third feedback resistance unit coupled between the inverting input terminal and the non-inverting output terminal of the differential amplifier circuit; and a fourth feedback resistance unit coupled between the non-inverting input terminal and the inverting output terminal of the differential amplifier circuit.

8. A signal wiring system comprising:
an output unit that outputs a differential signal;
a receiver unit that receives the differential signal from the output unit;
a signal wiring unit that conveys the differential signal from the output unit to the receiver unit; and
a jitter suppression circuit that suppresses a jitter amount in the differential signal received by the receiver unit according to a suppression coefficient,
wherein the output unit outputs the differential signal at a drivability according to the suppression coefficient of the jitter suppression circuit.

9. The signal wiring system according to claim 8, wherein the differential signal output by the output unit includes a clock signal, and
wherein the signal wiring unit includes clock distribution wiring that distributes the clock signal to the receiver unit.

10. The signal wiring system according to claim 1,
wherein the output unit includes an output driver that generates the differential signal, and
wherein the output driver includes:
a differential amplifier circuit to input, to an inverting input terminal and a non-inverting input terminal, the differential signal from a previous stage, and to output, to an inverting output terminal and to a non-inverting output terminal, an output signal according to that input differential signal.

11. The signal wiring system according to claim 10, wherein the output driver further includes an inductive element coupled between the inverting output terminal and the non-inverting input terminal.

12. The signal wiring system according to claim 8,
wherein the jitter suppression circuit includes:
a differential amplifier circuit to input, to an inverting input terminal and to a non-inverting input terminal, the differential signal conveyed by way of the signal wiring unit, and to output, to an inverting output terminal and to a non-inverting output terminal, an output signal according to that input differential signal;
a first feedback resistor unit coupled between the inverting input terminal and the non-inverting output terminal; and
a second feedback resistor unit coupled between the non-inverting input terminal and the inverting output terminal, and
wherein the suppression coefficient is determined according to resistance values of the first and second feedback resistor units.

13. The signal wiring system according to claim 12,
wherein the inverting input terminal and the non-inverting input terminal of the differential amplifier circuit are coupled to the signal wiring unit; and
wherein the inverting output terminal and the non-inverting output terminal of the differential amplifier circuit are coupled to the receiver unit.

14. The signal wiring system according to claim 12,
wherein the inverting input terminal and the non-inverting input terminal of the differential amplifier circuit are coupled to the signal wiring unit at first and second nodes; and
wherein the first and the second nodes are coupled to the receiver unit.

15. The signal wiring system according to claim 12,
wherein the first and the second feedback resistor units include at least one element that is chosen from a resistance element and a transfer gate.

16. The signal wiring system according to claim 8,
wherein the output unit includes an output driver to generate the differential signals, and
wherein the output driver includes:
a differential amplifier circuit to input, to an inverting input terminal and to a non-inverting input terminal, the differential signal from a previous stage; and to output, to an inverting output terminal and to a non-inverting output terminal, an output signal according to that input differential signal;
a third feedback resistance unit coupled between the inverting input terminal and the non-inverting output terminal of the differential amplifier circuit; and
a fourth feedback resistance unit coupled between the non-inverting input terminal and the inverting output terminal of the differential amplifier circuit.

17. A jitter suppression circuit comprising:
a differential amplifier circuit to input, to an inverting input terminal and to a non-inverting input terminal, a differential input signal, and to output, to an inverting output terminal and to a non-inverting output terminal, an output signal according to that differential input signal;
a first feedback resistor unit coupled between the inverting input terminal, and a non-inverting output terminal; and
a second feedback resistor unit coupled between the non-inverting input terminal and the inverting output terminal of the differential amplifier circuit,
wherein the first and second feedback resistance units have a resistance value that makes a Direct Current (DC) gain of the output signal 5 to 15 decibels to the differential input signal of the differential amplifier circuit.

18. The jitter suppression circuit according to claim 17, wherein the first and second feedback resistance unit include at least one element that is chose from a resistance element and a transfer gate.

* * * * *